United States Patent
Adachi

(10) Patent No.: US 7,747,381 B2
(45) Date of Patent: Jun. 29, 2010

(54) ROAD INFORMATION PROVISION SYSTEM, ROAD INFORMATION PROVISION APPARATUS, AND ROAD INFORMATION GENERATION METHOD

(75) Inventor: Shinya Adachi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/048,630

(22) Filed: Mar. 14, 2008

(65) Prior Publication Data

US 2008/0215233 A1    Sep. 4, 2008

Related U.S. Application Data

(63) Continuation of application No. 10/508,923, filed as application No. PCT/JP03/03875 on Mar. 27, 2003, now abandoned.

(30) Foreign Application Priority Data

Mar. 27, 2002  (JP) ............... 2002-089069
Jan. 31, 2003  (JP) ............... 2003-025037

(51) Int. Cl.
  *G08G 1/01*    (2006.01)
  *G09B 29/10*   (2006.01)
  *G01C 21/00*   (2006.01)

(52) U.S. Cl. .................. 701/118; 701/119; 701/211; 340/995.13

(58) Field of Classification Search ............... 701/118, 701/117, 119, 201, 209, 208.1, 211; 340/905, 340/933, 995.13; 342/357.1; 455/186.1, 455/45; 382/243
See application file for complete search history.

(56) References Cited

U.S. PATENT DOCUMENTS

| | | | |
|---|---|---|---|
| 5,488,559 A * | 1/1996 | Seymour | 701/208 |
| 5,539,645 A | 7/1996 | Mandhyan et al. | |
| 5,666,161 A * | 9/1997 | Kohiyama et al. | 375/240.18 |
| 6,009,403 A * | 12/1999 | Sato | 705/6 |
| 6,233,518 B1 * | 5/2001 | Lee | 701/117 |
| 6,314,360 B1 * | 11/2001 | Becker | 701/117 |
| 6,438,561 B1 * | 8/2002 | Israni et al. | 707/104.1 |
| 6,442,453 B1 | 8/2002 | Fukuoka | |

(Continued)

FOREIGN PATENT DOCUMENTS

EP    0 482 888 B1    4/1997

(Continued)

OTHER PUBLICATIONS

Japanese Office Action Dated Mar. 5, 2008.

(Continued)

*Primary Examiner*—Tan Q Nguyen
(74) *Attorney, Agent, or Firm*—Pearne & Gordon LLP

(57) ABSTRACT

An object of the invention is to provide a traffic information provision system which can arbitrarily set a position resolution and a traffic representation resolution and flexibly support a traffic information prediction service. The traffic information provision system of the invention quantizes the state quantity of traffic information changing along a road, converts said quantized state quantity to a value having statistical deviation, performs encoding of said value, and provides the encoded value to traffic information utilization apparatus such as a car navigation system. The traffic information utilization apparatus decodes said encoded state quantity to reproduce the traffic information on said road.

18 Claims, 45 Drawing Sheets

U.S. PATENT DOCUMENTS

| | | | |
|---|---|---|---|
| 6,473,688 B2 * | 10/2002 | Kohno et al. | 701/117 |
| 6,611,749 B1 * | 8/2003 | Berwanger et al. | 701/117 |
| 6,687,611 B1 * | 2/2004 | Hessing et al. | 701/208 |
| 6,876,773 B2 * | 4/2005 | Mizuno et al. | 382/243 |
| 2003/0182051 A1 | 9/2003 | Yamamoto | |

FOREIGN PATENT DOCUMENTS

| | | |
|---|---|---|
| JP | 04-038599 | 2/1992 |
| JP | 04-319992 | 11/1992 |
| JP | 07-029087 | 1/1995 |
| JP | 8-87234 | 4/1996 |
| JP | 09-181610 | 7/1997 |
| JP | 10-307993 | 11/1998 |
| JP | 2875520 | 3/1999 |
| JP | 11-284566 | 10/1999 |
| JP | 2000-057482 | 2/2000 |
| JP | 2000-258176 | 9/2000 |
| JP | 2001-041757 | 2/2001 |
| JP | 2001-133274 | 5/2001 |
| JP | 2001-241965 | 9/2001 |
| JP | 2001-357490 | 12/2001 |
| JP | 2002-009165 | 1/2002 |
| JP | 2002-228467 | 8/2002 |
| WO | 02/091587 A1 | 11/2002 |

OTHER PUBLICATIONS

Chinese Office Action.

Canadian Office action; Mar. 16, 2010.

* cited by examiner

SHAPE VECTOR REFERENCE NODE
FIG. 1(b) QUANTIZATION OF SAMPLING POINTS IN THE DIRECTION OF DISTANCE 
FIG. 1(c) QUANTIZATION OF TRAFFIC INFORMATION (SPEED) 
FIG. 1(d) DIFFERENCE REPRESENTATION OF STATISTICAL PREDICTION VALUE 

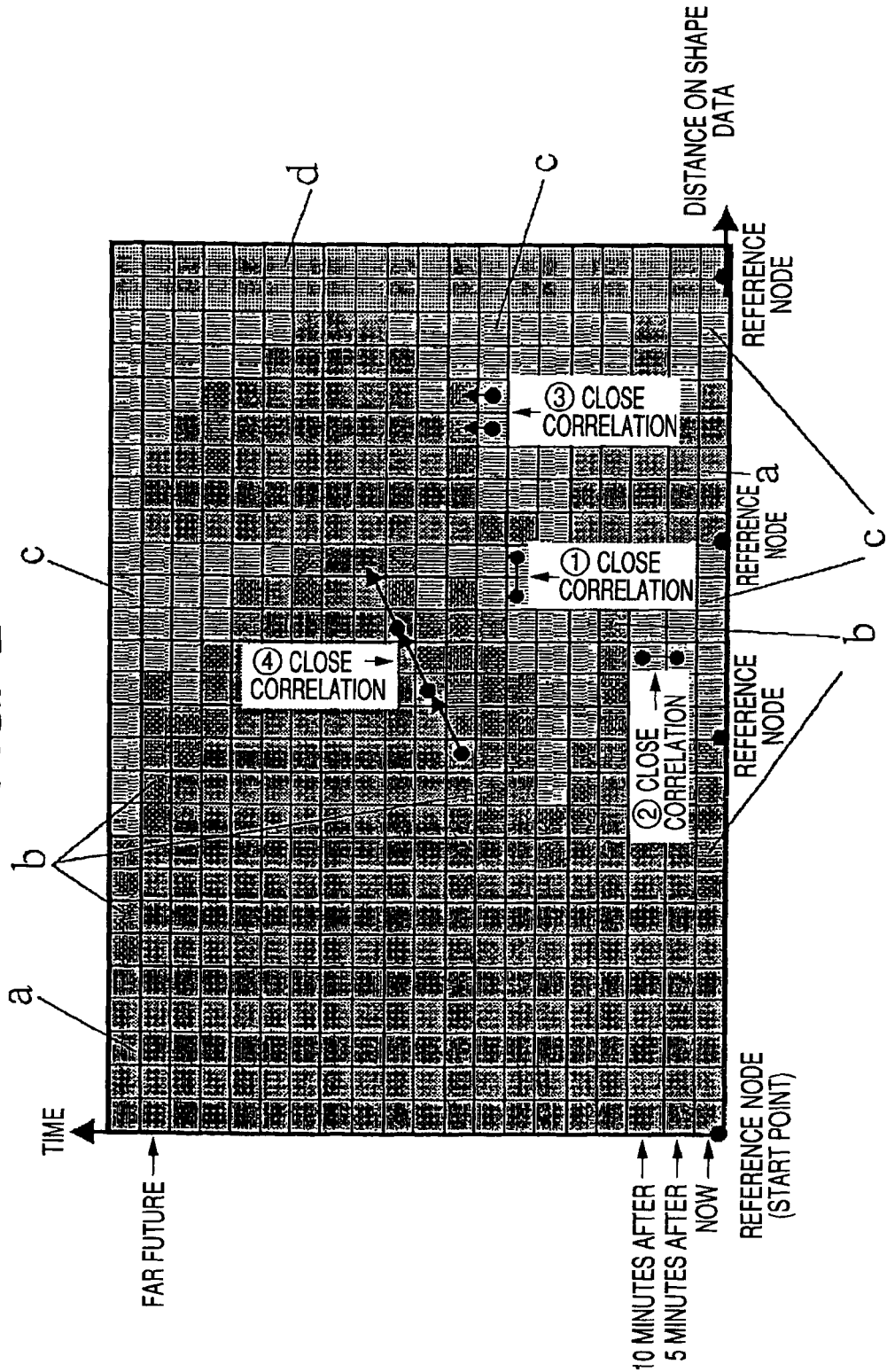

FIG. 3

TRAFFIC INFORMATION
QUANTIZATION TABLE
(SPEED QUANTIZATION TABLE)

| QUANTIZED VOLUME | SPEED (km/h) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10~11 |
| 11 | 12~13 |
| 12 | 14~15 |
| 13 | 16~17 |
| 14 | 18~19 |
| 15 | 20~24 |
| 16 | 25~29 |
| 17 | 30~34 |
| 18 | 35~39 |
| 19 | 40~44 |
| 20 | 45~49 |
| 21 | 50~59 |
| 22 | 60~69 |
| 23 | 70~79 |
| 24 | 80~99 |
| ⋮ | |
| 30 | 200 OR MORE |

FIG. 4

EXAMPLE OF ENCODING TABLE OF STATISTICAL PREDICTION DIFFERENCE VALUE OF TRAFFIC INFORMATION

| SPECIAL CODE | | CODE | ADDITIONAL BIT |
|---|---|---|---|
| SECTION LENGTH CHANGE CODE | | 101 | 3 (40/80/160/···/5120m) |
| TRAFFIC INFORMATION QUANTIZATION TABLE CHANGE CODE | | 111110 | 4 (TABLE NUMBER) |
| IDENTIFICATION CODE FOR A POINT CORRESPONDING TO REFERENCE NODE | | 1100 | 6 (CORRESPONDING REFERENCE NODE NUMBER) + 8 (OFFSET DISTANCE FROM REFERENCE NODE) |

| ENCODING TABLE FOR STATISTICAL PREDICTION DIFFERENCE VALUES OF TRAFFIC INFORMATION | | CODE | ADDITIONAL BIT I | ADDITIONAL BIT II (RANGE) |
|---|---|---|---|---|
| RUN LENGTH | CHANGE VOLUME | | | |
| 0 | 0 | 0 | 0 | — |
| 5 | 0 | 100 | 0 | — |
| 10 | 0 | 1101 | 0 | — |
| 0 | ±1 | 1110 | 1 (± IDENTIFICATION) | 0 |
| 0 | ±2 | 111100 | 1 (± IDENTIFICATION) | 0 |
| 0 | ±4 | 111101 | 1 (± IDENTIFICATION) | 1 (3 OR 4) |

FIG. 7(a)

EXAMPLE OF MAP DATA STRUCTURE

| MANAGEMENT INFORMATION (INFORMATION TYPE/BLOCK DEFINITION, ETC.) ||
|---|---|
| NO. OF NODES N ||
| NODE NUMBER 1 ||
| NODE ATTRIBUTE INFORMATION OF NODE 1 ||
| LONGITUDE OF NODE 1 | LATITUDE OF NODE 1 |
| NO. OF NODES CONNECTED TO NODE 1 ||
| CONNECTING NODE NUMBER #1 | LINK NUMBER #1-1 |
| ∫ ||
| CONNECTING NODE NUMBER #m | LINK NUMBER #1-m |
| ∫ ∫ ||
| NODE NUMBER N ||
| NODE ATTRIBUTE INFORMATION OF NODE N ||
| LONGITUDE OF NODE N | LATITUDE OF NODE N |
| NO. OF NODES CONNECTED TO NODE N ||
| CONNECTING NODE NUMBER #1 | LINK NUMBER #N-1 |
| ∫ ||
| CONNECTING NODE NUMBER #m | LINK NUMBER #N-m |
| NO. OF LINK L ||
| LINK NUMBER 1 ||
| LINK ATTRIBUTE INFORMATION OF LINK 1 ||
| NO. OF COMPONENT INTERPOLATION POINTS OF LINK 1 ||
| LONGITUDE OF INTERPOLATION POINT 1-1 | LATITUDE OF INTERPOLATION POINT 1-1 |
| ∫ ||
| LONGITUDE OF INTERPOLATION POINT 1-p | LATITUDE OF INTERPOLATION POINT 1-p |
| ∫ ∫ ||
| LINK NUMBER L ||
| LINK ATTRIBUTE INFORMATION OF LINK L ||
| NO. OF COMPONENT INTERPOLATION POINTS OF LINK L ||
| LONGITUDE OF INTERPOLATION POINT L-1 | LATITUDE OF INTERPOLATION POINT L-1 |
| ~ ||
| LONGITUDE OF INTERPOLATION POINT L-p | LATITUDE OF INTERPOLATION POINT L-p |

FIG. 7(b)

EXAMPLE OF TRAFFIC INFORMATION DATA (EXAMPLE OF TRAVEL TIME/SPEED)

| MAP DATA LINK NUMBER 1 ||
|---|---|
| CURRENT: TRAVEL TIME | CURRENT: SPEED |
| 5 MINUTES AFTER: TRAVEL TIME | 5 MINUTES AFTER: SPEED |
| 10 MINUTES AFTER: TRAVEL TIME | 10 MINUTES AFTER: SPEED |
| ∫ ||
| Z MINUTES AFTER: TRAVEL TIME | Z MINUTES AFTER: SPEED |
| ∫ ∫ ||
| MAP DATA LINK NUMBER K ||
| CURRENT: TRAVEL TIME | CURRENT: SPEED |
| 5 MINUTES AFTER: TRAVEL TIME | 5 MINUTES AFTER: SPEED |
| 10 MINUTES AFTER: TRAVEL TIME | 10 MINUTES AFTER: SPEED |
| ∫ ||
| Z MINUTES AFTER: TRAVEL TIME | Z MINUTES AFTER: SPEED |
| ∫ ∫ ||

FIG. 8(a)

SHAPE DATA STRING INFORMATION
(CODING/COMPRESSION DATA)

| |
|---|
| HEADER INFORMATION |
| NO. OF SHAPE DATA N |
| SHAPE DATA IDENTIFICATION NUMBER=1 |
| ENCODING TABLE IDENTIFICATION CODE |
| ACCURACY INFORMATION OF MAP DATA AT SHAPE SOURCE |
| DIRECTION OF ONE-WAY TRAFFIC (FORWARD/BACKWARD/NONE) |
| BEGINNING NODE NUMBER ps |
| NODE ps X DIRECTION ABSOLUTE COORDINATE (LONGITUDE) |
| NODE ps Y DIRECTION ABSOLUTE COORDINATE (LATITUDE) |
| NODE ps ABSOLUTE BEARING |
| ps POSITION ERROR (m) / ps BEARING ERROR (°) |
| MAXIMUM POSITION ERROR OF ENCODED SHAPE DATA T (m) / MAXIMUM BEARING ERROR OF ENCODED SHAPE DATA T (°) |
| ENCODED SHAPE DATA INCLUDES THE FOLLOWING INFORMATION: <br> - REFERENCE NODE SETTING CODE <br> - SECTION LENGTH CHANGE CODE <br> - EOD CODE |
| END NODE NUMBER pe |
| NODE pe X DIRECTION RELATIVE COORDINATE (LONGITUDE) |
| NODE pe Y DIRECTION RELATIVE COORDINATE (LATITUDE) |
| NODE pe ABSOLUTE BEARING |
| pe POSITION ERROR (m) / pe BEARING ERROR (°) |
| ～ |
| SHAPE DATA IDENTIFICATION NUMBER=M |
| ～ |

FIG. 8(b)

TRAFFIC INFORMATION

| |
|---|
| HEADER INFORMATION |
| NO. OF TRAFFIC-INFORMATION-PROVIDED SECTIONS |
| TRAFFIC-INFORMATION-PROVIDED SECTION SERIAL NUMBER 1 |
| REFERENCE SHAPE DATA STRING NUMBER=N |
| DIRECTION IDENTIFICATION FLAG (FORWARD/BACKWARD) |
| BEGINNING REFERENCE NODE Pa / END REFERENCE NODE Pb |
| DISTANCE DIRECTION QUANTIZED SECTION LENGTH IDENTIFICATION CODE |
| TRAFFIC INFORMATION QUANTIZATION TABLE IDENTIFICATION CODE |
| ENCODING TABLE IDENTIFICATION CODE |
| NO. OF QUANTIZED UNIT SECTIONS |
| TRAFFIC INFORMATION AT THE BEGINNING (INITIAL VALUE) |
| TRAFFIC INFORMATION ENCODED BY THE DIFFERENCE VALUE FROM STATISTICAL PREDICTION VALUE. INCLUDES THE FOLLOWING INFORMATION; <br> - SECTION LENGTH CHANGE CODE AND SECTION LENGTH AFTER CHANGE <br> - TRAFFIC INFORMATION QUANTIZATION TABLE CHANGE CODE AND TABLE NUMBER AFTER CHANGE <br> - IDENTIFICATION CODE FOR THE POINT CORRESPONDING TO REFERENCE NODE AND CORRESPONDING REFERENCE NODE NUMBER+OFFSET DISTANCE |
| ～ |
| TRAFFIC-INFORMATION-PROVIDED SECTION SERIAL NUMBER=W |
| ～ |

FIG. 10(a)

| TARGET DATA EXPANSION RATIO | IMPORTANCE OF INFORMATION A | IMPORTANCE OF INFORMATION B | IMPORTANCE OF INFORMATION C | REMARKS |
|---|---|---|---|---|
| DEFAULT | RANK 2 | RANK 3 | RANK 4 | – |
| ×2.0 OR ABOVE | +1 RANK | +2 RANK | +3 RANK | DETAILED |
| ×1.6–1.9 | ±0 RANK | +1 RANK | +2 RANK | ↑ |
| ×1.1–1.3 | ±0 RANK | ±0 RANK | +1 RANK | ↑ |
| ×1.0 | ±0 RANK | ±0 RANK | ±0 RANK | NOT CHANGED |
| ×0.7–0.9 | ±0 RANK | ±0 RANK | −1 RANK | ↓ |
| ×0.6–0.5 | ±0 RANK | −1 RANK | −2 RANK | ↓ |
| ×0.4 OR BELOW | −1 RANK | −2 RANK | −3 RANK | SIMPLIFIED |

FIG. 10(b)

| QUANTIZATION-UNIT RANK | DISTANCE DIRECTION QUANTIZATION-UNIT M | TRAFFIC INFORMATION QUANTIZATION TABLE N | DETAIL LEVEL |
|---|---|---|---|
| RANK 1 | 50m | TABLE 1 | DETAILED |
| RANK 2 | 100m | TABLE 2 | RATHER DETAILED |
| RANK 3 | 150m | TABLE 2 | STANDARD |
| RANK 4 | 200m | TABLE 3 | RATHER COARSE |
| RANK 5 | 200m | TABLE 4 | COARSE |

| 6 | 8 | 7 | 7 | 20 | 21 | 9 | 9 | 9 |

PEAK (DIFFERENCE FROM TRAFFIC
INFORMATION VOLUME IN THE PRECEDING/SUBSEQUENT
SECTION EXCEEDS THE PRESPECIFIED VALUE)

| 6 | 8 | 7 | 7 | 8 | 8 | 9 | 9 | 9 |

| 21 | 23 | 20 | 25 | 7 | 24 | 23 | 25 | 23 |

DIP (DIFFERENCE FROM TRAFFIC
INFORMATION VOLUME IN THE PRECEDING/SUBSEQUENT
SECTION EXCEEDS THE PRESPECIFIED VALUE)

| 21 | 23 | 20 | 25 | 25 | 24 | 23 | 22 | 23 |

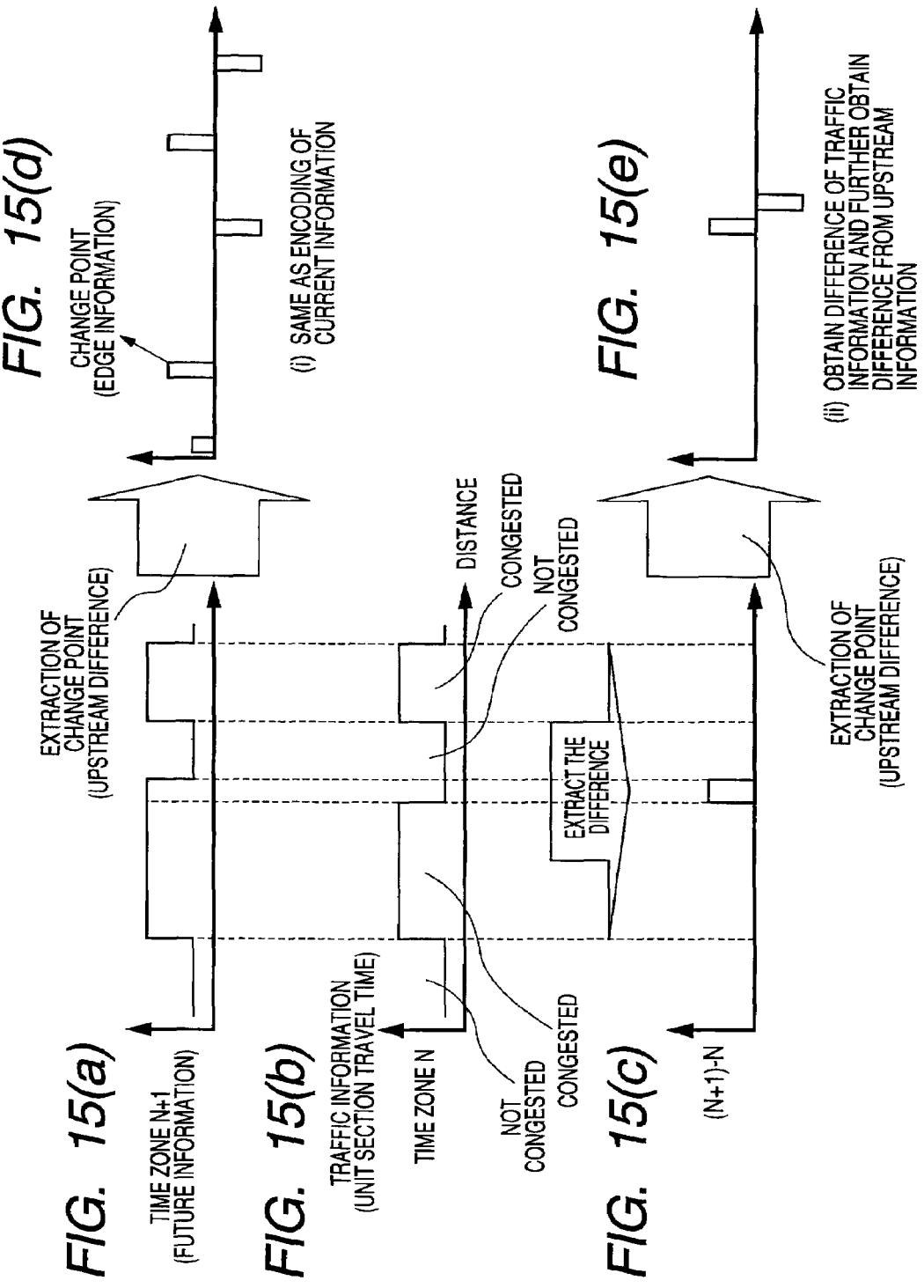

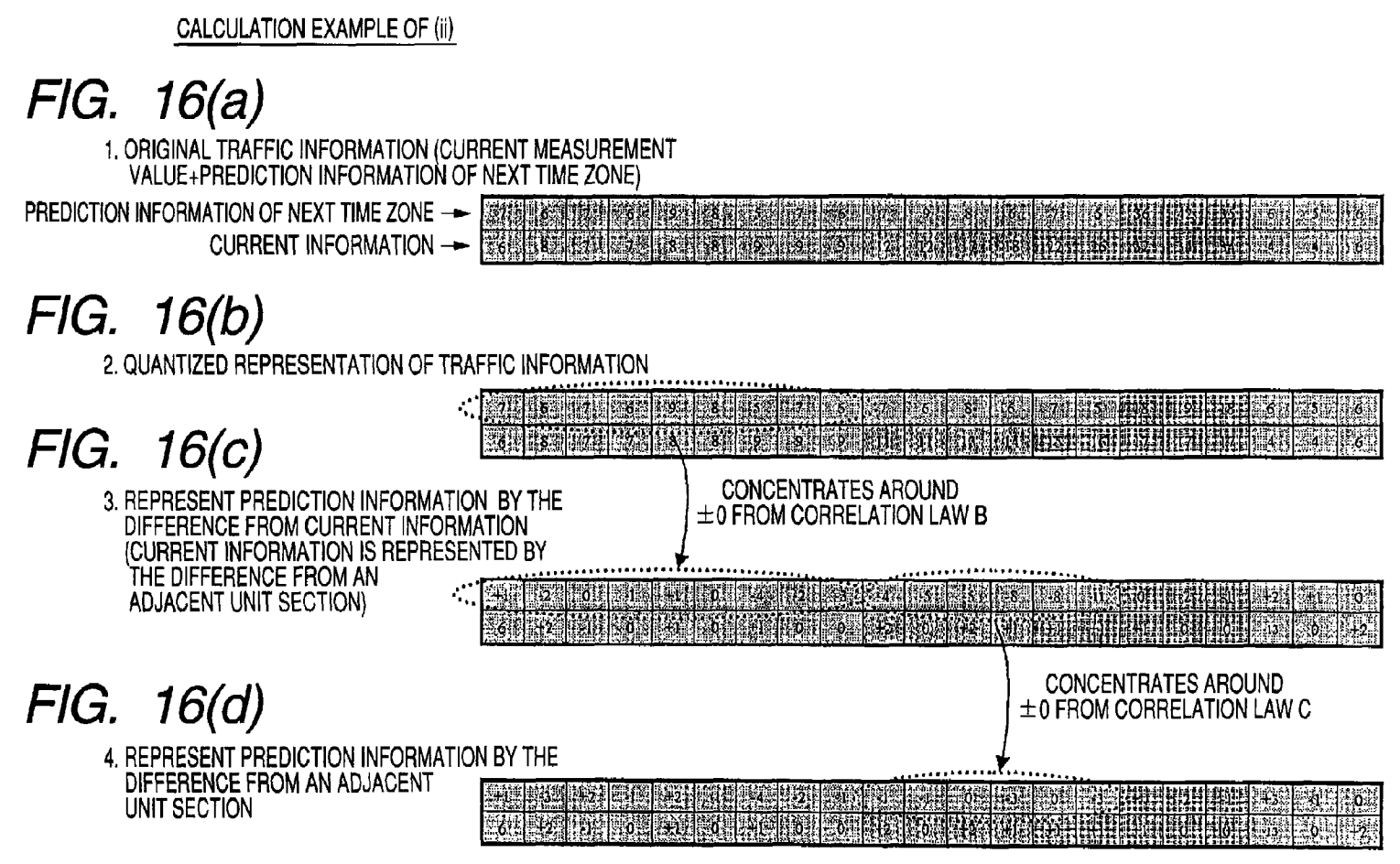

FIG. 16(a)
CALCULATION EXAMPLE OF (ii)
1. ORIGINAL TRAFFIC INFORMATION (CURRENT MEASUREMENT VALUE + PREDICTION INFORMATION OF NEXT TIME ZONE)

FIG. 16(b)
2. QUANTIZED REPRESENTATION OF TRAFFIC INFORMATION

FIG. 16(c)
3. REPRESENT PREDICTION INFORMATION BY THE DIFFERENCE FROM CURRENT INFORMATION (CURRENT INFORMATION IS REPRESENTED BY THE DIFFERENCE FROM AN ADJACENT UNIT SECTION)

FIG. 16(d)
4. REPRESENT PREDICTION INFORMATION BY THE DIFFERENCE FROM AN ADJACENT UNIT SECTION

FIG. 17(a)

| SPECIAL CODE | | CODE | ADDITIONAL BIT | |
|---|---|---|---|---|
| SECTION LENGTH CHANGE CODE | | 101 | 3 (40/80/160/---/5120m) | |
| TRAFFIC INFORMATION QUANTIZATION TABLE CHANGE CODE | | 111110 | 4 (TABLE NUMBER) | |
| IDENTIFICATION CODE FOR A POINT CORRESPONDING TO REFERENCE NODE | | 1100 | 6 (CORRESPONDING REFERENCE NODE NUMBER) + 8 (OFFSET DISTANCE FROM REFERENCE NODE) | |
| ENCODING TABLE FOR STATISTICAL PREDICTION DIFFERENCE VALUES OF TRAFFIC INFORMATION | | CODE | ADDITIONAL BIT I | ADDITIONAL BIT II (RANGE) |
| RUN LENGTH | CHANGE VOLUME | | | |
| 0 | 0 | 0 | 0 | - |
| 5 | 0 | 100 | 0 | - |
| 10 | 0 | 1101 | 0 | - |
| 0 | ±1 | 1110 | 1 (±IDENTIFICATION) | 0 |
| 0 | ±2 | 111100 | 1 (±IDENTIFICATION) | 0 |
| 0 | ±4 | 111101 | 1 (±IDENTIFICATION) | 1 (3 OR 4) |

FIG. 17(b)

| SPECIAL CODE | | CODE | ADDITIONAL BIT | |
|---|---|---|---|---|
| NOT | | | | |
| ENCODING TABLE FOR STATISTICAL PREDICTION DIFFERENCE VALUES OF PREDICTION INFORMATION | | CODE | ADDITIONAL BIT I | ADDITIONAL BIT II (RANGE) |
| RUN LENGTH | CHANGE VOLUME | | | |
| 0 | 0 | 0 | 0 | - |
| 5 | 0 | 100 | 0 | - |
| 10 | 0 | 1101 | 0 | - |
| 0 | ±1 | 1110 | 1 (±IDENTIFICATION) | 0 |
| 0 | ±2 | 111100 | 1 (±IDENTIFICATION) | 0 |
| 0 | ±4 | 111101 | 1 (±IDENTIFICATION) | 1 (3 OR 4) |

FIG. 20(a)

SHAPE DATA STRING INFORMATION

| |
|---|
| HEADER INFORMATION |
| NO. OF SHAPE DATA N |
| SHAPE DATA IDENTIFICATION NUMBER=1 |
| ENCODING TABLE IDENTIFICATION CODE |
| ACCURACY INFORMATION OF MAP DATA AT SHAPE SOURCE |
| DIRECTION OF ONE-WAY TRAFFIC (FORWARD/BACKWARD/NONE) |
| BEGINNING NODE NUMBER ps |
| NODE ps X DIRECTION ABSOLUTE COORDINATE (LONGITUDE) |
| NODE ps Y DIRECTION ABSOLUTE COORDINATE (LATITUDE) |
| NODE ps ABSOLUTE BEARING |
| ps POSITION ERROR (m) \| ps BEARING ERROR (°) |
| MAXIMUM POSITION ERROR OF ENCODED SHAPE DATAT (m) \| MAXIMUM BEARING ERROR OF ENCODED SHAPE DATAT (°) |
| ENCODED SHAPE DATA INCLUDES THE FOLLOWING INFORMATION: <br> · REFERENCE NODE SETTING CODE <br> · SECTION LENGTH CHANGE CODE <br> · EOD CODE |
| END NODE NUMBER pe |
| NODE pe X DIRECTION RELATIVE COORDINATE (LONGITUDE) |
| NODE pe Y DIRECTION RELATIVE COORDINATE (LATITUDE) |
| NODE pe ABSOLUTE BEARING |
| pe POSITION ERROR (m) \| pe BEARING ERROR (°) |
| ∫ |
| SHAPE DATA IDENTIFICATION NUMBER=M |
| ∫ |

FIG. 20(b)

TRAFFIC INFORMATION

| | |
|---|---|
| HEADER INFORMATION | |
| NO. OF TRAFFIC-INFORMATION-PROVIDED SECTIONS | |
| TRAFFIC-INFORMATION-PROVIDED SECTION SERIAL NUMBER 1 | |
| REFERENCE SHAPE DATA STRING NUMBER=N | |
| DIRECTION IDENTIFICATION FLAG (FORWARD/BACKWARD) | |
| BEGINNING REFERENCE NODE Pa \| END REFERENCE NODE Pb | |
| DISTANCE DIRECTION QUANTIZED SECTION LENGTH IDENTIFICATION CODE | |
| TRAFFIC INFORMATION QUANTIZATION TABLE IDENTIFICATION CODE | |
| CURRENT INFORMATION: ENCODING TABLE IDENTIFICATION CODE | |
| PREDICTION INFORMATION: ENCODING TABLE IDENTIFICATION CODE | ★ |
| NO. OF QUANTIZED UNIT SECTIONS | |
| NO. OF TIME ZONES OF PREDICTION INFORMATION | ★ |
| EFFECTIVE TIME OF CURRENT INFORMATION (HH:MM) | ★ |
| TRAFFIC INFORMATION AT THE BEGINNING (INITIAL VALUE) | |
| CURRENT TRAFFIC INFORMATION ENCODED USING STATISTICAL PREDICTION DIFFERENCE VALUE FROM AN ADJACENT POINT | |
| EFFECTIVE TIME OF PREDICTION INFORMATION 1 (HH:MM) | ★ |
| PREDICTION TRAFFIC INFORMATION ENCODED USING THE DIFFERENCE FROM PRECEDING TIME ZONE AND STATISTICAL PREDICTION DIFFERENCE VALUE FROM AN ADJACENT POINT | ★ |
| ∫ | ★ |
| EFFECTIVE TIME OF PREDICTION INFORMATION Q (HH:MM) | |
| PREDICTION TRAFFIC INFORMATION ENCODED USING THE DIFFERENCE FROM PRECEDING TIME ZONE AND STATISTICAL PREDICTION DIFFERENCE VALUE FROM AN ADJACENT POINT | ★ |
| TRAFFIC-INFORMATION-PROVIDED SECTION SERIAL NUMBER=2 | |
| ∫ | |

FIG. 22(a)
0. ORIGINAL TRAFFIC INFORMATION (CURRENT MEASUREMENT VALUE+PREDICTION INFORMATION IN THE NEXT TIME ZONE)

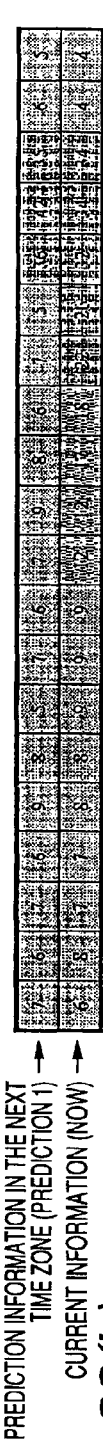

PREDICTION INFORMATION IN THE NEXT TIME ZONE (PREDICTION 1)
CURRENT INFORMATION (NOW)

FIG. 22(b)
1. REDUCE THE POSITION RESOLUTION TO HALF (AVERAGE THE TRAFFIC INFORMATION AND ROUND UP THE FRACTIONAL PORTION)

FIG. 22(c)
2. PERFORM QUANTIZATION BY USING A DETAILED QUANTIZATION TABLE

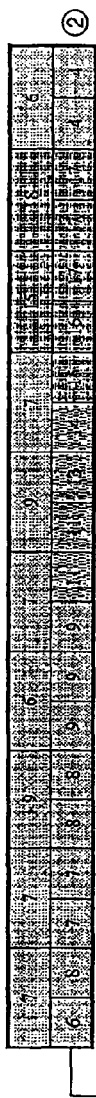

FIG. 22(d)
3. PERFORM QUANTIZATION BY USING A COARSE QUANTIZATION TABLE

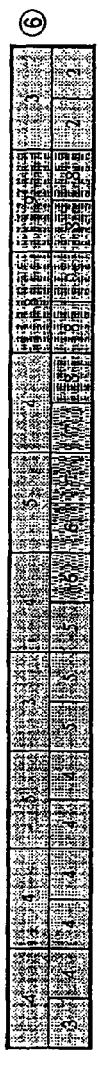

FIG. 22(e)
4. EXTRACT THE DIFFERENCE IN THE DIRECTION OF TIME BY USING A COARSE QUANTIZATION TABLE

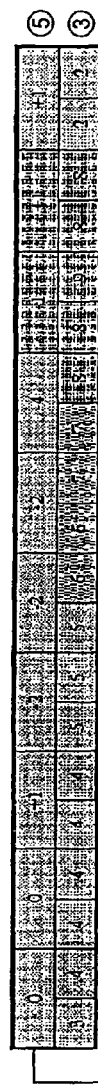

FIG. 22(f)
5. EXTRACT THE DIFFERENCE FROM UPSTREAM BY USING RESPECTIVE QUANTIZATION TABLES

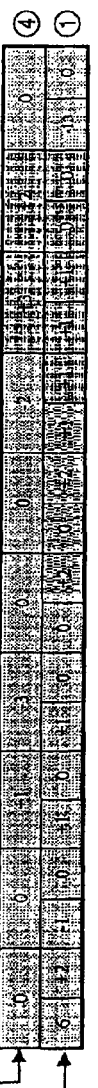

FIG. 23

**TRAFFIC INFORMATION QUANTIZATION TABLE
(SPEED QUANTIZATION TABLE)**

| SPEED (km/h) | QUANTIZED VOLUME (CURRENT) | QUANTIZED VOLUME (PREDICTION 1) | QUANTIZED VOLUME (PREDICTION 2) |
|---|---|---|---|
| 0 | 0 | 0 | 0 |
| 1 | 1 | 1 | 1 |
| 2 | 2 | | |
| 3 | 3 | 2 | |
| 4 | 4 | | |
| 5 | 5 | 3 | 2 |
| 6 | 6 | | |
| 7 | 7 | 4 | |
| 8 | 8 | | |
| 9 | 9 | 5 | 3 |
| 10~11 | 10 | | |
| 12~13 | 11 | 6 | |
| 14~15 | 12 | | |
| 16~17 | 13 | 7 | 4 |
| 18~19 | 14 | | |
| 20~24 | 15 | 8 | |
| 25~29 | 16 | | |
| 30~34 | 17 | 9 | 5 |
| 35~39 | 18 | | |
| 40~44 | 19 | 10 | |
| 45~49 | 20 | | |
| 50~59 | 21 | 11 | 6 |
| 60~69 | 22 | | |
| 70~79 | 23 | 12 | |
| 80~99 | 24 | | |
| 200 OR MORE | 30 | 15 | 8 (180km/h OR MORE) |

FIG. 24

TRAFFIC INFORMATION

| HEADER INFORMATION ||
|---|---|
| NO. OF TRAFFIC-INFORMATION-PROVIDED SECTIONS ||
| TRAFFIC-INFORMATION-PROVIDED SECTION SERIAL NUMBER 1 ||
| REFERENCE SHAPE DATA STRING NUMBER=N ||
| DIRECTION IDENTIFICATION FLAG (FORWARD/BACKWARD) ||
| BEGINNING REFERENCE NODE Pa | END REFERENCE NODE Pb |
| DISTANCE DIRECTION QUANTIZED SECTION LENGTH IDENTIFICATION CODE ||
| TRAFFIC INFORMATION QUANTIZATION TABLE IDENTIFICATION CODE ||
| CURRENT INFORMATION: ENCODING TABLE IDENTIFICATION CODE ||
| PREDICTION INFORMATION: ENCODING TABLE IDENTIFICATION CODE ||
| NO. OF QUANTIZED UNIT SECTIONS ||
| NO. OF TIME ZONES OF PREDICTION INFORMATION ||
| EFFECTIVE TIME OF CURRENT INFORMATION (HH:MM) ||
| TRAFFIC INFORMATION AT THE BEGINNING (INITIAL VALUE) ||
| CURRENT TRAFFIC INFORMATION ENCODED BY THE DIFFERENCE VALUE FROM STATISTICAL PREDICTION VALUE ||
| EFFECTIVE TIME OF PREDICTION INFORMATION 1 (HH:MM) ||
| POSITION RESOLUTION IDENTIFICATION CODE | QUANTIZATION TABLE NUMBER |
| PREDICTION TRAFFIC INFORMATION ENCODED BY THE DIFFERENCE VALUE FROM STATISTICAL PREDICTION VALUE ||
| ⌇ ||
| EFFECTIVE TIME OF PREDICTION INFORMATION Q (HH:MM) ||
| POSITION RESOLUTION IDENTIFICATION CODE | QUANTIZATION TABLE NUMBER |
| PREDICTION TRAFFIC INFORMATION ENCODED BY THE DIFFERENCE VALUE FROM STATISTICAL PREDICTION VALUE ||
| TRAFFIC-INFORMATION-PROVIDED SECTION SERIAL NUMBER=2 ||
| ⌇ ||

STATISTICAL PREDICTION VALUE OF ● = a① +b② +c③ (WHERE a+b+c=1)

EXAMPLE OF TRAFFIC INFORMATION IN FFT REPRESENTATION

| HEADER INFORMATION |
|---|
| NO. OF TRAFFIC-INFORMATION-PROVIDED SECTIONS |
| TRAFFIC-INFORMATION-PROVIDED SECTION SERIAL NUMBER 1 |
| REFERENCE SHAPE DATA STRING NUMBER=N |
| DIRECTION IDENTIFICATION FLAG (FORWARD/BACKWARD) |
| BEGINNING REFERENCE NODE Pa     END REFERENCE NODE Pb |
| TRAFFIC INFORMATION QUANTIZATION TABLE IDENTIFICATION CODE |
| ENCODING TABLE IDENTIFICATION CODE |
| AMOUNT OF SECTION SPLITTING BETWEEN REFERENCE NODES $2^N$ |
| DATA STRING WHERE FOURIER COEFFICIENTS ARE VARIABLE LENGTH ENCODED IN THE ORDER OF REAL PART TO IMAGINARY PART, AND LOW FREQUENCIES TO HIGH FREQUENCIES |
| ⁀ |
| TRAFFIC-INFORMATION-PROVIDED SECTION SERIAL NUMBER=W |
| ⁀ |

FIG. 30

EXAMPLE OF ENCODING TABLE OF FFT COEFFICIENTS

| SPECIAL CODE | | CODE | ADDITIONAL BIT | |
|---|---|---|---|---|
| EOD CODE | | 1100 | NOT | |
| ENCODING TABLE | | CODE | ADDITIONAL BIT I | ADDITIONAL BIT II (RANGE) |
| RUN LENGTH | FFT COEFFICIENTS | | | |
| 0 | 0 | 0 | 0 | – |
| 5 | 0 | 100 | 0 | – |
| 10 | 0 | 1101 | 0 | – |
| 0 | ±1 | 1110 | 1 (± IDENTIFICATION) | 0 |
| 0 | ±2 | 111100 | 1 (± IDENTIFICATION) | 0 |
| 0 | ±3-6 | 111101 | 1 (± IDENTIFICATION) | 2 (3/4/5/6 IDENTIFICATION) |

FIG. 31(a)

EXAMPLE OF TRAFFIC INFORMATION IN FFT REPRESENTATION 2
(LOW FREQUENCY COMPONENT/HIGH FREQUENCY COMPONENT SPLIT TYPE)

| HEADER INFORMATION | |
|---|---|
| NO. OF THIS INFORMATION | AMOUNT OF TRAFFIC INFORMATION SPLITTING |
| NO. OF TRAFFIC-INFORMATION-PROVIDED SECTIONS | |
| TRAFFIC-INFORMATION-PROVIDED SECTION SERIAL NUMBER 1 | |
| REFERENCE SHAPE DATA STRING NUMBER=N | |
| DIRECTION IDENTIFICATION FLAG (FORWARD/BACKWARD) | |
| BEGINNING REFERENCE NODE Pa | END REFERENCE NODE Pb |
| TRAFFIC INFORMATION QUANTIZATION TABLE IDENTIFICATION CODE | |
| ENCODING TABLE IDENTIFICATION CODE | |
| AMOUNT OF SECTION SPLITTING BETWEEN REFERENCE NODE $2^N$ | |
| DATA STRING WHERE FOURIER COEFFICIENTS ARE VARIABLE LENGTH ENCODED IN THE ORDER OF REAL PART TO IMAGINARY PART, COEFFICIENTS OF BASE FUNCTION TO HIGHT FREQUENCIES | |
| ⌇ | |
| TRAFFIC-INFORMATION-PROVIDED SECTION SERIAL NUMBER=W | |
| ⌇ | |

BASIC INFORMATION & INFORMATION ON FFT COEFFICIENTS OF LOW FREQUENCY COMPONENT

FIG. 31(b)

| HEADER INFORMATION | |
|---|---|
| NO. OF THIS INFORMATION ※ | AMOUNT OF TRAFFIC INFORMATION SPLITTING ※ |
| TRAFFIC-INFORMATION-PROVIDED SECTION SERIAL NUMBER 1 | |
| DATA STRING WHERE FOURIER COEFFICIENTS ARE VARIABLE LENGTH ENCODED IN THE ORDER OF REAL PART TO IMAGINARY PART, COEFFICIENTS OF BASE FUNCTION TO HIGHT FREQUENCIES | |
| ⌇ | |
| TRAFFIC-INFORMATION-PROVIDED SECTION SERIAL NUMBER=W | |
| ⌇ | |

INFORMATION ON FFT COEFFICIENTS OF HIGH FREQUENCY COMPONENT (PART OF SUBSECTIONS)

FIG. 32(a)

ORDINARY DATA TRANSMISSION ORDER
(DATA IS SEQUENTIALLY TRANSMITTED IN THE ORDER TO LOW FREQUENCY COMPONENTS TO HIGH FREQUENCY COMPONENTS IN ASCENDING ORDER OF SECTION NUMBER)

| INFORMATION (FFT COEFFICIENT) IN SECTION NO.=1 | | INFORMATION (FFT COEFFICIENT) IN SECTION NO.=2 | | INFORMATION (FFT COEFFICIENT) IN SECTION NO.=v | |
|---|---|---|---|---|---|
| REAL PART | IMAGINARY PART | REAL PART | IMAGINARY PART | REAL PART | IMAGINARY PART |
| 45 | 64 | -13 | 87 | 53 | 16 |
| 34 | -22 | 8 | -32 | -89 | 45 |
| 25 | -7 | 5 | 27 | 14 | -22 |
| 0 | 6 | -4 | -4 | 0 | 19 |
| -2 | 0 | 0 | 3 | -1 | -21 |
| -14 | -4 | 0 | 0 | -4 | -6 |
| 3 | 0 | 3 | -9 | -5 | 0 |
| 0 | -1 | 0 | 0 | 9 | -3 |
| 0 | 12 | 0 | 6 | 8 | 0 |
| 0 | -5 | 4 | 8 | 4 | 0 |
| -2 | 0 | 0 | 12 | 0 | 6 |
| 0 | 0 | 2 | 0 | 3 | -12 |
| -1 | 0 | -4 | 3 | 5 | 0 |
| 3 | 1 | 0 | -2 | 0 | -3 |
| -2 | -7 | 0 | -1 | 1 | 0 |
| 0 | 0 | 0 | 7 | -3 | 4 |
| 0 | -1 | 3 | 0 | -2 | 0 |
| 0 | 0 | 0 | 0 | 0 | 1 |
| -6 | 6 | 6 | 0 | 0 | 0 |
| 3 | 0 | 0 | 4 | 0 | 0 |
| 4 | 0 | -2 | -1 | 0 | 0 |
| 1 | 0 | -2 | -1 | 0 | -2 |

FIG. 32(b)

DATA TRANSMISSION ORDER ACCORDING TO THIS SYSTEM
(LOW FREQUENCY COMPONENTS IN ALL SECTIONS ARE TRANSMITTED, THEN HIGH FREQUENCY COMPONENTS ARE SEQUENTIALLY TRANSMITTED)

| INFORMATION (FFT COEFFICIENT) IN SECTION NO.=1 | | INFORMATION (FFT COEFFICIENT) IN SECTION NO.=2 | | INFORMATION (FFT COEFFICIENT) IN SECTION NO.=v | |
|---|---|---|---|---|---|
| REAL PART | IMAGINARY PART | REAL PART | IMAGINARY PART | REAL PART | IMAGINARY PART |
| 34 | -22 | | | -89 | 45 |
| | | | | | |
| 0 | 6 | 3 | 0 | 0 | 19 |
| | | 0 | 6 | | |
| -14 | 0 | 0 | 8 | -4 | -6 |
| | | 4 | 12 | | |
| 0 | 0 | 0 | 0 | -5 | -3 |
| 0 | 1 | 2 | 3 | 9 | 0 |
| 0 | 12 | -4 | -2 | 8 | 0 |
| -2 | -5 | 0 | -1 | 4 | 6 |
| 0 | 0 | 0 | 7 | 0 | -12 |
| -1 | 0 | 3 | 0 | 3 | 0 |
| 3 | 1 | 0 | 0 | 5 | -3 |
| -2 | -7 | 6 | 0 | 0 | 0 |
| 0 | 0 | 0 | 4 | 1 | 4 |
| 0 | -1 | | | -3 | 0 |
| 0 | 0 | | | -2 | 1 |
| -6 | 6 | | | 0 | 0 |
| 3 | 0 | | | 0 | 0 |
| 4 | 0 | | | 0 | 0 |
| 1 | 0 | -2 | -1 | 0 | -2 |

EXAMPLE OF APPARATUS CONFIGURATION

FIG. 34(a)

ORIGINAL INFORMATION

| HEADER INFORMATION ||
|---|---|
| NO. OF THIS INFORMATION | AMOUNT OF TRAFFIC INFORMATION SPLITTING |
| NO. OF TRAFFIC-INFORMATION-PROVIDED SECTIONS ||
| TRAFFIC-INFORMATION-PROVIDED SECTION SERIAL NUMBER 1 ||
| REFERENCE SHAPE DATA STRING NUMBER=N ||
| DIRECTION IDENTIFICATION FLAG (FORWARD/BACKWARD) ||
| BEGINNING REFERENCE NODE Pa | END REFERENCE NODE Pb |
| DISTANCE DIRECTION QUANTIZED SECTION LENGTH IDENTIFICATION CODE ||
| TRAFFIC INFORMATION QUANTIZATION TABLE IDENTIFICATION CODE ||
| CURRENT INFORMATION: ENCODING TABLE IDENTIFICATION CODE ||
| PREDICTION INFORMATION: ENCODING TABLE IDENTIFICATION CODE ||
| NO. OF QUANTIZED UNIT SECTIONS ||
| NO. OF TIME ZONES OF PREDICTION INFORMATION ||
| EFFECTIVE TIME OF CURRENT INFORMATION (HH:MM) ||
| TRAFFIC INFORMATION AT THE BEGINNING (INITIAL VALUE) ||
| CURRENT TRAFFIC INFORMATION ENCODED USING THE STATISTICAL PREDICTION DIFFERENCE VALUE FROM AN ADJACENT POINT ||
| TRAFFIC-INFORMATION-PROVIDED SECTION SERIAL NUMBER=2 ||
| ₹ ||

FIG. 34(b)

DIFFERENCE INFORMATION FROM PRECEDING TIME ZONE

| HEADER INFORMATION ||
|---|---|
| NO. OF THIS INFORMATION | AMOUNT OF TRAFFIC INFORMATION SPLITTING |
| TRAFFIC-INFORMATION-PROVIDED SECTION SERIAL NUMBER 1 ||
| ENCODING TABLE IDENTIFICATION CODE ||
| EFFECTIVE TIME OF PREDICTION INFORMATION Q (HH:MM) ||
| CURRENT TRAFFIC INFORMATION ENCODED USING THE DIFFERENCE FROM PRECEDING TIME ZONE AND STATISTICAL PREDICTION DIFFERENCE VALUE FROM AN ADJACENT POINT ||
| TRAFFIC-INFORMATION-PROVIDED SECTION SERIAL NUMBER=2 ||
| ₹ ||

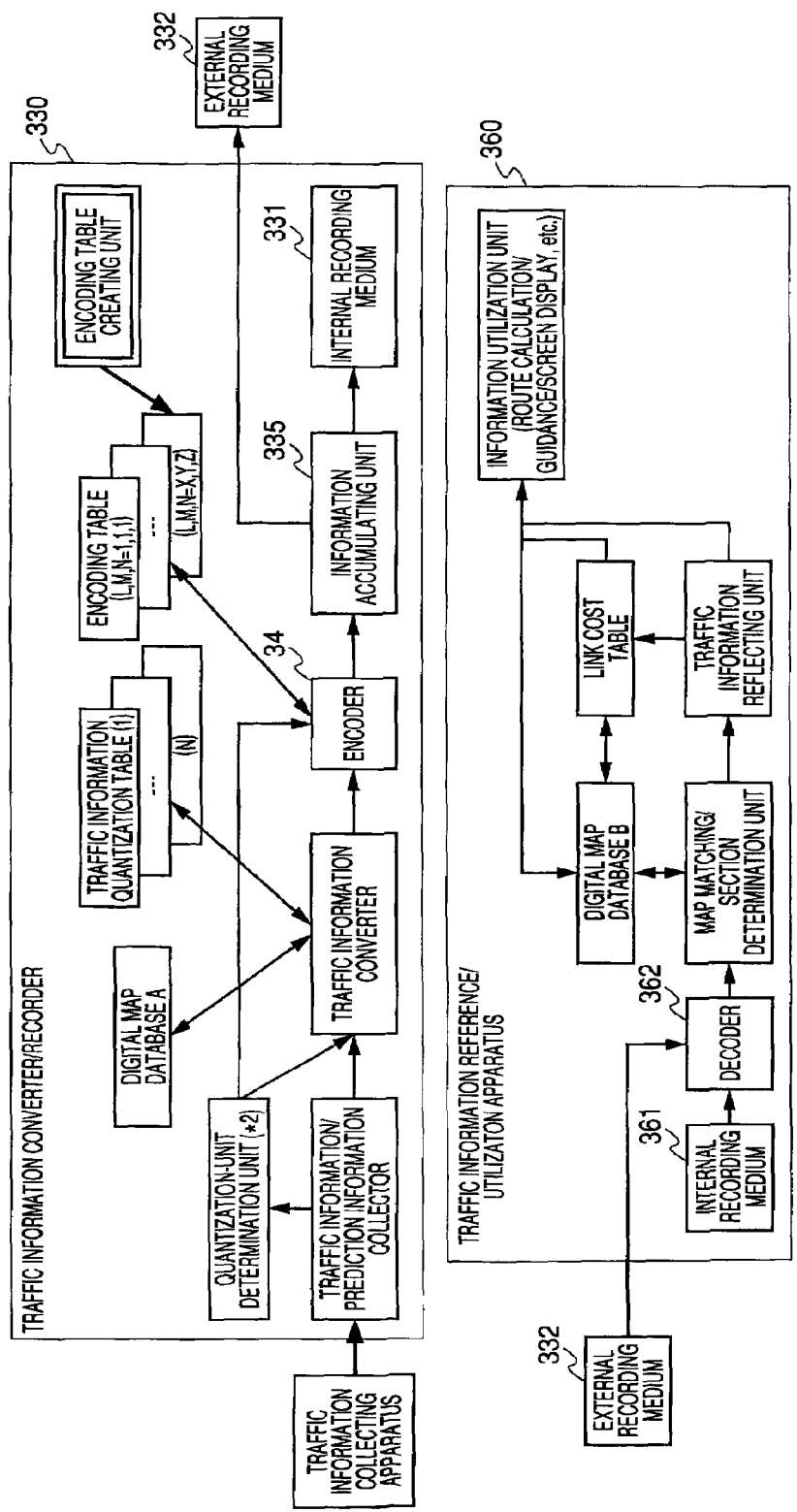

IDEAL SYSTEM

CURRENT LINK SYSTEM

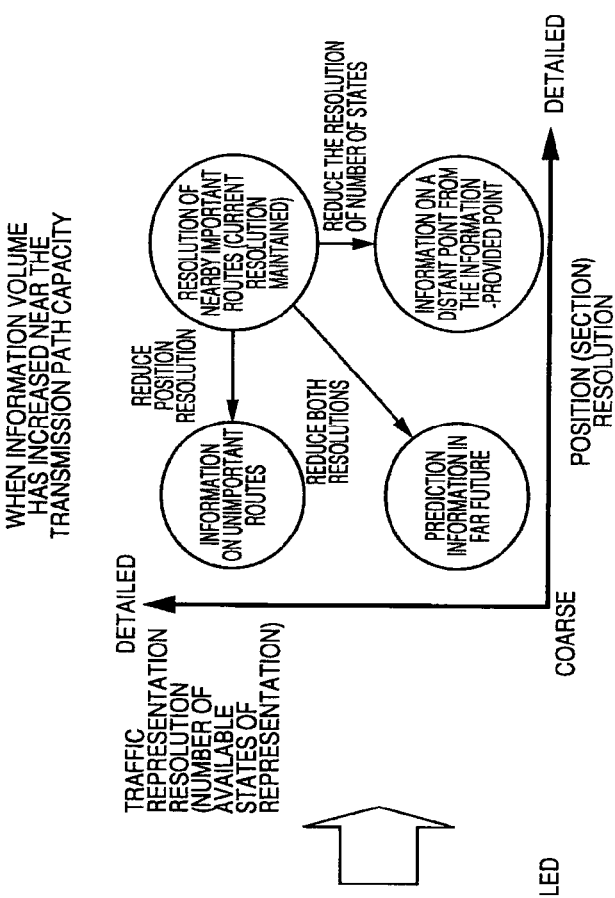
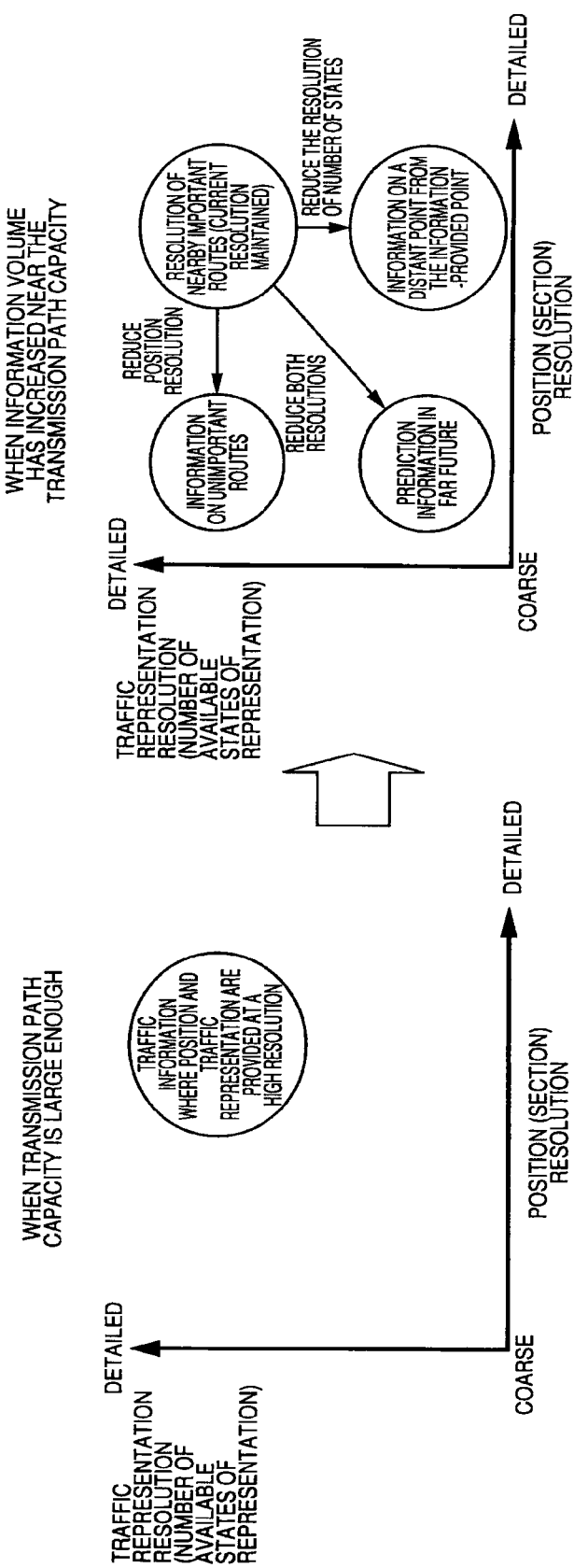

ROAD INFORMATION PROVISION SYSTEM, ROAD INFORMATION PROVISION APPARATUS, AND ROAD INFORMATION GENERATION METHOD

TECHNICAL FIELD

The present invention relates to a method for generating traffic information representing traffic congestion and travel time, a system for providing the traffic information, and apparatus constituting the system, and in particular to a method for generating traffic information representing traffic congestion and travel time, a system for providing the traffic information, and apparatus constituting the system which converts traffic information such as traffic congestion and travel time in a new form in order to efficiently provide road information full of rich information.

BACKGROUND ART

<Current VICS Traffic Information>

VICS (Vehicle Information and Communication System) which currently provides a car navigation system with a traffic information provision system collects and edits traffic information and transmits traffic congestion information and travel time information representing the time required by way of an FM multiplex broadcast or a beacon.

The current VICS information represents the current traffic information as follows:

Traffic situation is displayed in three stages, congestion (ordinary road: ≦10 km/h; expressway: ≦20 km/h);

heavy traffic (ordinary road: 10-20 km/h; expressway: 20-40 km/h); and light traffic (ordinary road: ≦20 km/h; expressway: ≦40 km/h).

The traffic congestion information representing the traffic congestion is displayed as "VICS link number+state (congestion/heavy traffic/light traffic/unknown)" in case the entire VICS link (position information identifier) is congested uniformly.

In case only part of the link is congested, the traffic congestion information representing the traffic congestion is displayed as "VICS link number+congestion head distance (distance from beginning of link)+congestion end (distance from beginning of link)+state (congestion)"

In this case, when the congestion starts from the start end of a link, the head congestion distance is displayed as 0xff. In case different traffic situations coexist in a link, each traffic situation is respectively described in accordance with this method.

The link travel time information representing the travel time of each link is displayed as "VICS link number+travel time"

As prediction information representing the future change trend of traffic situation, an increase/decrease trend graph showing the four states, "increase trend/decrease trend/no change/unknown" is displayed while attached to the current information.

<Transmission of Road Position Independent of VICS Link Number>

VICS traffic information displays traffic information while identifying a road with a link number. The receiving party of this traffic information grasps the traffic situation of the corresponding road on its map based on the link number. The system where the sending party and receiving party shares link numbers and node numbers to identify a position on the map requires introduction or a change in new link numbers and node numbers each time a road is constructed anew or changed. With this, the data on the digital map from each company needs updating so that the maintenance requires huge social costs.

In order to offset these disadvantages, the inventors of the invention proposes, in the Japanese Patent Laid-Open No. 2001-41757, a system where a sending party arbitrarily sets a plurality of nodes on a road shape and transmits a "shape data string" representing the node position by a data string and a receiving party uses the shape data string to perform map matching in order to identify a road on a digital map. A system which compresses data by way of Fourier coefficient approximation to delete the data volume of this shape data string is proposed in the Japanese Patent Laid-Open No. 2002-228467. A system which applies statistical processing on the data to convert the data into data which concentrates around ±0 and then converts the data to variable length encoded data for data compression is proposed in the Japanese Patent Application No. 2001-134318.

The following approach is possible as an approach to correct a shape data using relative positions for display. In case the positions of nodes included in a shape data, cumulative errors occur. The cumulative errors tend to accumulate in case the shape data has a long distance and has a "gentle shape" such as the National Highway 268 and the National Highway 1. In order to prevent this, the shape as a shape data is extracted so that the shape will be temporarily bent by way of a crossing road as shown in thick lines in FIG. 40 and then returned to the main route. In this practice, a "point which characterizes the shape" such as the intersection or a curve with a large curvature is set as a reference node to cancel the cumulative errors. The receiving party compares the distance between reference nodes shown in dotted lines obtained by decoding the received data with the distance between reference nodes of a shape data shown in thick lines thus correcting the relative positions. A reference node specified in a position where cumulative errors can be corrected is hereinafter referred to as a "reference node for correction of relative position".

With this system, it is possible to transmit a road position without using link numbers or node numbers.

[Patent Document 1]

Japanese Patent Laid-Open No. 2001-41757

[Patent Document 2]

Japanese Patent Laid-Open No. 2002-228467

However, the currently provided traffic information has the following problems and cannot support a variety of requests for road information, that is, traffic information in line with general traffic information, information on the areas along the road, and information on the pertinent road.

<Problem 1 of the Current Traffic Information>

In the current traffic information, resolution of information representation is too coarse. The congestion information can be displayed in units of 10 meters concerning the position although the number of traffic information representations is only three, traffic congestion, heavy traffic and light traffic.

Representation of traffic information concerning the link travel time may be made in units of 10 seconds although the position resolution is only "per link" and the minute speed distribution in the link cannot be represented.

This could present the following problem:

As shown in FIG. 41, a person saw the display of the congested section (section where the vehicle speed is 10 km/h or below) and thinking that the time required to get out of the congestion as long as 500 meters will be short, entered the congested area. It took the person to get out of the congested section of 500 meters as long as 25 minutes because of too many vehicles.

Another story is: a person saw the display of "Link A travel time=30 minutes" and assuming that link A takes longer time, selected an alternate route of the target route of traffic information and it took the person 25 minutes to get through. On the link A, only the congested section near the intersection was time-consuming (25 minutes) wile the remaining sections required only five minutes to pass through. Using the road in dotted lines in the target route area displayed on a car navigation system could take only seven minutes to pass through.

As shown in FIG. 42, in case a graph where the vertical axis represents the number of states of traffic information which can be represented (traffic information resolution) and the horizontal axis represents the position (or section) resolution is used to arrange the traffic information, the link travel time has a lower position resolution while it has a higher traffic representation resolution. The congestion information has a lower traffic representation resolution while it has a higher position resolution.

In the current congestion information and link travel time information, an intermediate representation shown in FIG. 42 by circle is not available.

The traffic information in this circle can be collected. In the case of a probe car which collects data from vehicles running on the road, it is possible to collect information at each level in the circle in the center facility. For example, in case a vehicle speed is measured per 300 meters in units of 3 km/h up to 120 km/h, the position resolution is 200 m and the state number resolution is 40. Original information prior to editing collected via an existing sensor is similar traffic information at an intermediate level, although there are variations in the information due to sensor density.

Ideally, a traffic information representation method is preferable which can arbitrarily change both the position resolution and traffic information resolution in line with the source data.

<Problem 2 of the Current Traffic Information>

In the current traffic information provision system, the position resolution and traffic representation resolution are fixed. In case the data volume is huge, the transmission path capacity is exceeded as shown in FIG. 43(a). In this case, the data in excess of the transmission path capacity is lost and the data is not transmitted to the receiving party, however important the data may be.

Ideally, as shown in FIG. 43(b), it is desirable that the data in excess be not lost when the data volume is about to exceed the transmission path capacity and the resolution of data be made "coarse" in ascending order of importance so as to reduce the overall data volume.

As shown in FIG. 44(a), while the transmission path capacity is large enough, the traffic information is represented by a high position resolution and traffic representation resolution. When the information volume has increased near the transmission path capacity, as shown in FIG. 44(b), it is desirable to reduce the position resolution concerning the information on a route whose importance is low, reduce the traffic representation resolution concerning the information on a route distant from the information provision point, or reduce the position resolution and traffic representation resolution concerning the prediction information on far future in order to keep displaying the information on an immediately close route of importance in a high resolution.

<Problem 3 of the Current Traffic Information>

The current traffic information representation form is not fit for representation of traffic prediction information.

Various approaches of traffic prediction have been developed such as a simulation method. With the future development of traffic information providers, services to provide traffic prediction information are expected to grow.

However, the current traffic information provides only the data showing the "increase/decrease trend" as prediction information. An attempt to transmit the prediction information of congestion in the current traffic information representation form results in a proportional increase in the data volume corresponding to the number of prediction time zones. Concerning the congestion state, there are many cases where congestion occurs in a time zone and in the next time zone also. Thus data is transmitted in a duplicated fashion, which is inefficient.

SUMMARY OF THE INVENTION

Object of the Invention

The invention has been accomplished to solve the problems with the related art traffic information and has as an object to provide a method for generating traffic information which can arbitrarily set a position resolution and a traffic representation resolution and change the position resolution and the traffic representation resolution on demand in accordance with the importance of information, and which can flexibly support a "prediction service" expected to occur in future, as well as to provide a system which provides the traffic information, and apparatus constituting the system.

A road information provision system according to the invention comprises: road information provision apparatus for providing a state quantity of road information changing along a road as a function of distance from the reference point on the road; and road information utilization apparatus for reproducing the road information on the road from the function.

The road information provision system according to the invention comprises: road information provision apparatus for sampling a state quantity of road information changing along a road in the direction of distance of the road in intervals corresponding to the position resolution of the road information, quantizing the state quantity at each sampling point in accordance with the traffic representation resolution representing the number of available states of the road information, encoding the obtained value and providing the encoded value; and road information utilization apparatus for decoding the encoded value to reproduce the road information on the road.

The road information provision system according to the invention comprises: road information provision apparatus for sampling a state quantity of prediction information of road information changing along a road in the direction of distance of the road, quantizing the state quantity at each sampling point, encoding the obtained value and providing the encoded value; and road information utilization apparatus for decoding the encoded value to reproduce the prediction information of the road information on the road.

The road information provision system according to the invention comprises: road information provision apparatus for sampling a state quantity of road information or prediction information changing along a road in the direction of distance of the road, converting the state quantity at each sampling point to a value having statistical deviation, encoding the obtained value and providing the encoded value; and road information utilization apparatus for decoding the encoded value to reproduce the road information or prediction information on the road.

The road information provision system according to the invention comprises: road information provision apparatus for sampling a state quantity of prediction information of road information changing along a road in the direction of distance of the road, representing the state quantity at each sampling point by a difference value from a state quantity at the sampling point in an adjacent time zone, quantizing the difference value, encoding the quantized value and providing the encoded value; and road information utilization apparatus for decoding the encoded value to reproduce the prediction information of the road information on the road.

The road information provision system according to the invention comprises: road information provision apparatus for sampling a state quantity of road information or prediction information changing along a road in the direction of distance of the road, transforming the state quantity at each sampling point to a coefficient value of a frequency component by way of orthogonal transformation, encoding the coefficient value and providing the encoded value; and road information utilization apparatus for decoding the encoded coefficient value to reproduce the road information or prediction information on the road.

The road information provision system according to the invention comprises: road information provision apparatus for sampling a state quantity of prediction information of road information changing along a road in the direction of distance of the road, representing the state quantity at each sampling point by a difference value from a state quantity at the sampling point in an adjacent time zone, transforming the state quantity at each sampling point to a coefficient value of a frequency component by way of orthogonal transformation, encoding the coefficient value and providing the encoded value; and road information utilization apparatus for decoding the encoded coefficient value to reproduce the prediction information of road information on the road.

Road information generation apparatus according to the invention comprises: a road information converter for sampling a state quantity of road information changing along a road in the direction of distance of the road in intervals corresponding to the position resolution of the road information and quantizing the state quantity at each sampling point by using a quantization table; an encoder for encoding, by using an encoding table, the data processed by the road information converter; a quantization-unit determination unit for determining an interval corresponding to the position resolution in accordance with the state of collection of road information and selecting the quantization table used by the road information converter and the encoding table used by the encoder; and an information transmitter for transmitting the data encoded by the encoder.

Road information utilization apparatus according to the invention comprises: an information receiver for receiving road information represented by a function of distance from the reference node of a shape data indicating the road and the data representing the shape data; and a map matching section for performing map matching by using the data representing the shape data to identify the target road of road information;

A road information generation method according to the invention comprises the steps of: sampling a state quantity of road information changing along a road in the direction of distance of the road in intervals corresponding to the position resolution of the road information; quantizing the state quantity at each sampling point in accordance with the traffic representation resolution representing the number of available states of the road information; converting the state quantity obtained to a value having statistical deviation; and encoding the obtained value to generate road information.

The road information generation method according to the invention comprises the steps of: sampling a state quantity of road information changing along a road in the direction of distance of the road in intervals corresponding to the position resolution of the road information; transforming the state quantity at each sampling point to a coefficient value of a frequency component by way of orthogonal transformation; quantizing the coefficient value to obtain a value having statistical deviation; and encoding the post-quantization coefficient value to generate road information.

A program according to the invention causes a computer to perform the steps of: determining an interval of sampling of road information and the coarseness of quantization in accordance with the state of collection of road information; sampling the state quantity of the collected road information in the direction of distance of the road in the intervals; quantizing the state quantity at each sampling point by using a quantization table corresponding to the coarseness of quantization; and encoding/compressing the quantized value.

The program according to the invention causes a computer to perform the steps of: determining an interval of sampling of road information and the coarseness of quantization in accordance with the state of collection of road information; sampling the state quantity of the collected road information in the direction of distance of the road in the intervals; performing orthogonal transformation on the state quantity at each sampling point to obtain a coefficient value of a frequency component; quantizing the coefficient value by using a quantization table corresponding to the coarseness of quantization; and encoding/compressing the quantized value.

On a recording medium for providing road information are recorded data of road information on a state quantity of road information changing along a road represented by a function of distance from the reference point on the road and road section reference data for identifying the road.

According to the road information provision system of the invention, it is possible to arbitrarily set a position resolution and a traffic representation resolution thus changing the resolution of information representation in accordance with the importance of road information. Further, it is possible to flexibly support the "prediction service" of road information.

BRIEF DESCRIPTION OF THE DRAWINGS

FIGS. 1(a) to 1(d) show a method for calculating a statistical prediction difference value of traffic information in a first embodiment of the invention;

FIG. 2 shows a correlation used to generate traffic information in the first embodiment of the invention;

FIG. 3 shows a traffic information quantization table in the first embodiment of the invention;

FIG. 4 shows an encoding table of statistical prediction difference values in the first embodiment of the invention;

FIGS. 7(a) and 7(b) are data block diagrams of original information in the first embodiment of the invention;

FIGS. 8(a) and 8(b) are data block diagrams of shape data and traffic information in the first embodiment of the invention;

FIGS. 10(a) and 10(b) show a quantization-unit determination tables in the first embodiment of the invention;

FIGS. 15(a) to 15(e) illustrate the difference representation of prediction information in a second embodiment of the invention;

FIGS. 16(a) to 16(d) show a method for calculating a statistical prediction difference value in the second embodiment of the invention;

FIGS. 17(a) and 17(b) show a statistical prediction difference value and prediction information in the second embodiment of the invention;

FIGS. 20(a) and 20(b) are data block diagrams of shape data and traffic information in the second embodiment of the invention;

FIGS. 22(a) to 22(f) show a process of changing the information representation resolution of prediction information in the second embodiment of the invention;

FIG. 23 shows a traffic information quantization table of prediction information in the second embodiment of the invention;

FIG. 24 is a data block diagram of traffic information whose information representation resolution of prediction information has been modified in the second embodiment of the invention;

FIG. 26 shows a quantization procedure using FFT in a third embodiment of the invention;

FIG. 29 is a data block diagram of traffic information in FFT representation in the third embodiment of the invention;

FIG. 30 shows an encoding table of FFT coefficient in the third embodiment of the invention;

FIGS. 31(a) and 31(b) are a data block diagram of traffic information in a fourth embodiment of the invention;

FIGS. 32(a) and 32(b) show a procedure for transmitting traffic information in the fourth embodiment of the invention;

FIGS. 34(a) and 34(b) are data block diagrams of traffic information in a fifth embodiment of the invention;

FIG. 35 is a system block diagram in a sixth embodiment of the invention;

FIGS. 44(a) and 44(b) illustrate the concept of information display resolution;

Figure 1A:
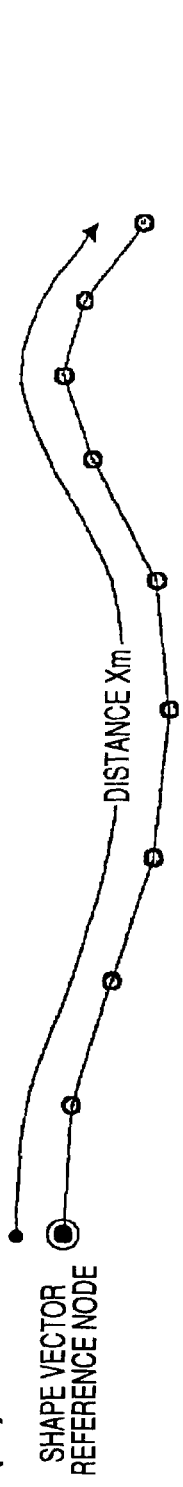

DESCRIPTION OF THE REFERENCE
NUMERALS AND SIGNS

10: Traffic information measurement apparatus
11: Sensor processor A
12: Sensor processor B
13: Sensor processor C
14: Traffic information calculator
15: Traffic information/Prediction information calculator
16: Statistical information
21: Sensor A (ultrasonic vehicle sensor)
22: Sensor B (AVI sensor)
23: Sensor C (probe car)
30: Traffic information transmitter
31: Traffic information collector
32: Quantization-unit determination unit
33: Traffic information converter
34: encoder
35: Information transmitter
36: Digital map database
50: Encoding table creating unit
51: Encoding table calculating unit
52: Encoding table
53: Traffic information quantization table
54: Distance quantization-unit parameter table
60: Receiving party apparatus
61: Information receiver
62: Decoder
63: Map matching/Section determination unit
64: Traffic information reflecting unit
66: Link cost table
67: Information utilization unit
68: Local vehicle position determination unit
69: GPS antenna
70: Gyroscope
71: Guidance apparatus
80: Probe car collection system
81: Travel locus measurement information utilization unit
82: Decoder
83: Travel locus receiver
84: Encoding table transmitter
85: Encoding table selector
86: Encoding table data
87: Measurement information data inverse converter
90: Probe-car-mounted machine
91: Travel locus transmitter
92: encoder
93: Local vehicle position determination unit
94: Encoding table receiver 95: Encoding table data
96: Travel locus measurement information accumulating unit
97: Measurement information data converter
98: Sensor information collector
101: GPS antenna
102: Gyroscope
106: Sensor A
107: Sensor B
108: Sensor C
135: Information transmitter A
161: Information receiver A
235: Information transmitter B
261: Information receiver B
330: Traffic information converter/recorder
331: Internal storage medium
332: External storage medium
335: Information accumulating unit
360: Traffic information reference/utilization apparatus
361: Internal storage medium
362: Decoder
430: Server
431: Request information receiver
432: Transmit traffic information area/detail level determination unit
433: Traffic information data
434: Encoding table data
435: Traffic information quantization/coding unit
436: Response information transmitter
460: Client apparatus
461: Request information transmitter
462: Display range/Data size determination unit
463: Input operation section
464: Response information receiver
465: Decoder
466: Traffic information utilization unit
467: Digital map database

BEST MODE FOR CARRYING OUT THE INVENTION

In the invention, the "travel time information" and the "congestion information" as a "traffic congestion index" are essentially the same in that they are traffic information obtained based on the vehicle travel speed and traffic information changing continuously along a road, although they use different representation forms (number of position resolution and state resolution representations).

In the invention, traffic information changing continuously along a road (target road) is understood as a function of distance (length) from a reference node defined at the beginning of the target road or in the target road section. A party which provides the traffic information transmits this function or coefficient of the function and the road section reference data to identify the target road to a receiving party. The receiving party reproduces the function from the received information and identifies the target road from the road section reference data thus reproducing the traffic information changing continuously along the road.

By doing so, it is possible to uniformly represent and transmit "travel time information" and "congestion information" by using the same concept and same rules.

To represent traffic information by a function, an embodiment of the invention performs re-sampling equidistantly between the reference nodes of a target road (shape data) for which traffic information is provided and samples data in the direction of distance, obtains the value of a travel speed (or a travel time or congestion information) at each sampling point and represents the traffic information by a data string of this value.

Various road section reference data may be sued as mentioned later. The following embodiment pertains to a case where the target road is identified by using a shape data representing the road shape.

First Embodiment

<Traffic Information Generation Method>

A first embodiment of the invention pertains to a case where a state quantity of traffic information (congestion information and travel time information) at each sampling point is quantized and variable length encoded to generate traffic information.

Referring to FIG. 2, a schematic view of a graph showing the traffic information (congestion information and travel time information), with the horizontal axis representing a distance on the shape data and the vertical axis a time axis. One square of the horizontal axis represents the unit block length of a quantization-unit (quantization-unit in the direction of distance) set by way of sampling while one square of the vertical axis a constant time interval. In each square of this graph is recorded travel speed information corresponding to the distance from the reference node (start point) and the time elapsed from the current time. A reference node for correction of relative position is set to the reference node on the horizontal axis.

In FIG. 2, for the convenience, the graph is segmented into the areas: (a) area where the travel speed is ranked in congestion (ordinary road: $\leq 10$ km/h; expressway: $\leq 20$ km/h); (b) area ranked in heavy traffic (ordinary road: 10-20 km/h; expressway: 20-40 km/h); (c) area ranked in light traffic (ordinary road: $\geq 20$ km/h; expressway: $\geq 40$ km/h); and (d) unknown area.

In case traffic information is displayed as shown in FIG. 2, the actual traffic obtained from past observation of traffic can be represented by one of the following correlation laws indicating the correlation between squares:

Correlation Law A: Correlation between adjacent squares in the direction of distance is high (when traffic is congested at a point, traffic is also congested at an adjacent point) ((1) in FIG. 2)

Correlation Law B: Correlation between adjacent squares in the direction of time is high (when traffic is congested, an a time, traffic is also congested at a preceding or subsequent time) ((2) in FIG. 2)

Correlation Law C: Correlation concerning a change in the direction of time is high (when traffic becomes congested, traffic generally becomes congested on all roads at the same time) ((3) in FIG. 2)

Correlation Law D: the extension speed of congestion beginning with a bottleneck intersection (intersection as a start point of congestion, such as "Ayase Bus Stop") and the inverse propagation speed on an expressway are substantially constant.

For variable length encoding of traffic information, use of such laws can reduce the overall data volume.

FIGS. 1(a) to 1(d) show the processing where statistical processing is made on traffic information data (state quantity) to convert the data to data which concentrates around ±0 in variable length encoding of traffic information at the current time.

As shown in FIG. 1(a), a shape data having a distance of X m is equidistantly segmented by a unit block length (Example: 50-500 m) to perform sampling. As shown in FIG.

1(b), the average speed of a vehicle passing through each sampling point is obtained. In FIG. 1(b), the value of the obtained speed is shown in a square representing the quantization-unit set through sampling. In this case, the average travel time of congestion rank of a vehicle passing through each sampling interval may be obtained instead of the average speed.

Next, the speed value is converted to a quantized volume by using the traffic information quantization table shown in FIG. 3. In the traffic information quantization table, in response to the user's request for detailed information of congestion, setting is made so that the quantized volume will increase in steps of 1 km/h in case the speed is less than 10 km/h, 2 km/h in case the speed is within the range of 10 to 19 km/h, 2 km/h in case the speed is within the range of 10 to 19 km/h, 5 km/h in case the speed is within the range of 20 to 49 km/h, and 10 km/h in case the speed is equal to or more than 50 km/h. Quantized values obtained using the traffic information quantization table are shown in FIG. 1(c).

Next, the quantized volume is represented by a difference from the statistical prediction value. In this example, difference between the quantized speed Vn in the target quantization-unit and a quantized speed Vn−1 in the upstream quantization-unit or statistical prediction value S is calculated by using (Vn−Vn−1). The calculation result is shown in FIG. 1(d).

In case the quantized value is represented by a difference from the statistical prediction value, frequency of appearance of values around ±0 becomes higher from Correlation Law A (traffic situation is similar between adjacent quantization-units).

Variable length encoding is performed on the data thus processed. The variable length encoding is the same as that described in the Japanese Patent Application No. 2001-134318.

Past traffic information is analyzed and an encoding table for encoding the statistical prediction difference value of traffic information is created. By using the encoding table, the value in FIG. 1(d) is encoded. For example, +2 is encoded to "1111000" while −2 is encoded to "1111001". In case 0 continues, such as 00000, the data is encoded to "100".

In the encoding table, special codes are set: a block length change code for indicating the change in unit block length from a point in case the unit block length has been switched from the point; a traffic information quantization table change code for indicating the change in the traffic information quantization table from a point in case the traffic information quantization table (FIG. 3) has been switched from the point; and a reference-node-related point identification code for indicating a reference node.

In this way, by quantizing the traffic information and converting the quantized value to a statistical prediction value and increasing the frequency of values appearing around ±0, the effect of data compression through variable length encoding (Huffman/arithmetic code/Shannon-Fano, etc.) or run-length compression (run-length encoding) is enhanced. In particular, in case the congestion information is displayed in ranks of four stages as in the related art, the statistical prediction difference value in most quantization-units is 0 so that the effect of run-length compression is very high.

For the travel time information also, all extralegal speeds are set to a single quantized value in the traffic information quantization table (FIG. 3) to enhance the effect of run-length compression.

It is possible to change the position resolution and traffic representation resolution of traffic information by changing the unit block length for sampling of shape data or by switching between traffic information quantization tables. It is readily possible to appropriately control the traffic information resolution and position resolution of traffic information in accordance with the volume of traffic information, transmission path capacity of an information provision medium, and the requested accuracy.

While the quantized speed Vn−1 in the upstream quantization-unit is used as a statistical prediction value, the statistical prediction value may be another value. For example, in case the weighted average of speeds up to third the quantization-unit upstream is used as a statistical prediction value S, the statistical prediction value S is calculated by using the following formula:

Statistical prediction value S=aVn−1+bVn−2+cVn−3 (where a+b+c=1)

<System Configuration>

Figure 5:
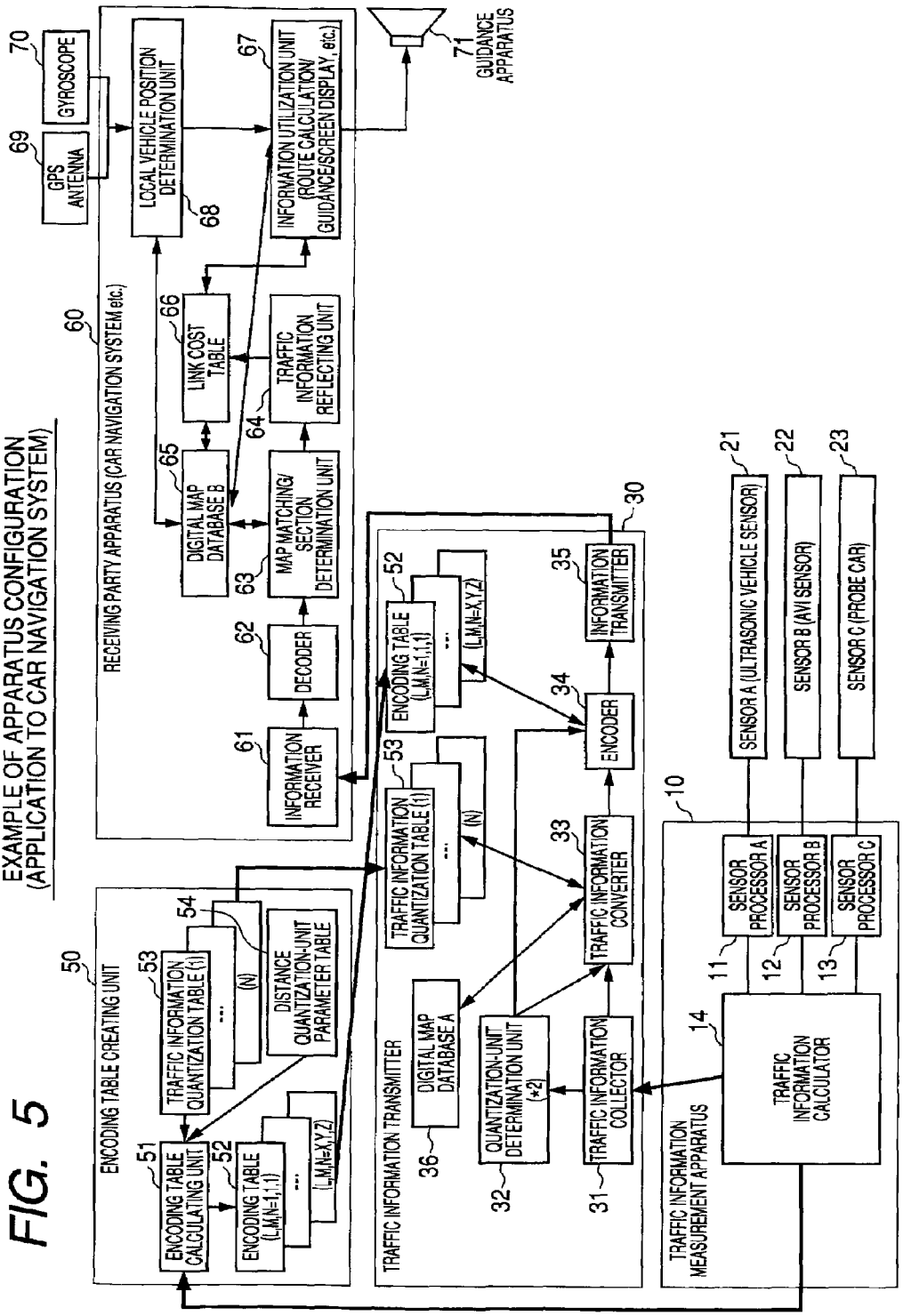
FIG. 5 is a system block diagram in the first embodiment of the invention.

FIG. 5 shows a broadcast-type traffic information provision system which generates and provides traffic information. The system comprises: traffic information measurement apparatus 10 for measuring traffic information by using a sensor A (ultrasonic vehicle sensor) 21, a sensor B (AVI sensor) 22 and a sensor C (probe car) 23; an encoding table creating unit 50 for creating an encoding table used for encoding of traffic information; a traffic information transmitter 30 for encoding and transmitting traffic information and information in the target section; and receiving party apparatus for receiving transmitted information.

The traffic information measurement apparatus 10 comprises a sensor processor A 11, a sensor processor B 12 and a sensor processor B 13 for processing data acquired from each sensor 21, 22, 23 and a traffic information calculator 14 for generating traffic information by using the data processed in the sensor processors 11, 12, 13 and outputting the traffic information data and data indicating the target section.

The encoding table creating unit 50 comprises a plural types of traffic information quantization tables 53 used for quantization of traffic information and a distance quantization-unit parameter table 54 defining plural types of sampling point intervals (unit block length). The encoding table calculating unit for creating an encoding table classifies the past traffic situations into patterns and creates various encoding tables 52 for all combinations of a traffic information quantization table 53 and a sampling point interval.

The traffic information transmitter 30 comprises: a traffic information collector 31 for collecting traffic information from the traffic information measurement apparatus 10; a quantization-unit determination unit 32 for determining the traffic situation based on the collected traffic information, determining the sampling point interval (unit block length of quantization-unit in the direction of distance), and determining the quantization table and encoding table to be used; a traffic information converter 33 for quantizing traffic information and converting traffic information to a statistical prediction difference value by using the sampling point interval and the traffic information quantization table 53 determined by the quantization-unit determination unit 32, and converting shape data in the target section to a statistical prediction difference value; an encoder 34 for encoding traffic information by using the encoding table 52 determined by the quantization-unit determination unit 32 and performing cording of the shape data in the target section; an information transmitter 35 for transmitting the encoded traffic information data and shape data; and a digital map database 36 referenced by the a traffic information converter 33.

The receiving party apparatus 60 comprises: an information receiver 61 for receiving the information provided by the traffic information transmitter 30; a decoder for decoding the received information to reproduce the traffic information and shape data; a map matching/section determination unit 63 for determining the target section of traffic information; a traffic information reflecting unit for reflecting the received information in the data of the target section in a link cost table 66; a local vehicle position determination unit 68 for determining the position of a local vehicle by using a GPS antenna 69 and a gyroscope 70; an information utilization unit for utilizing the link cost table 66 for a route search from the local vehicle position to the destination; and guidance apparatus 71 for providing audio guidance based on the route search result.

Features such as those implemented by the encoding table calculating unit 51 in the encoding table creating unit 50 and the quantization-unit determination unit 32, the traffic information converter 33, the encoder 34, and the information transmitter 35 in the encoding table creating unit 30 can be implemented by causing a computer to perform programmed processing. Features such as those implemented by the decoder 62, the map matching/section determination unit 63, the traffic information reflecting unit 64, the Local vehicle position determination unit 68 and the information utilization unit 67 can be implemented by causing a computer to perform programmed processing.

FIGS. 7(a) and 7(b) show a data structure of map data (a) indicating the target section of traffic information and traffic information data (b) output by the traffic information measurement apparatus 10.

Figure 6:
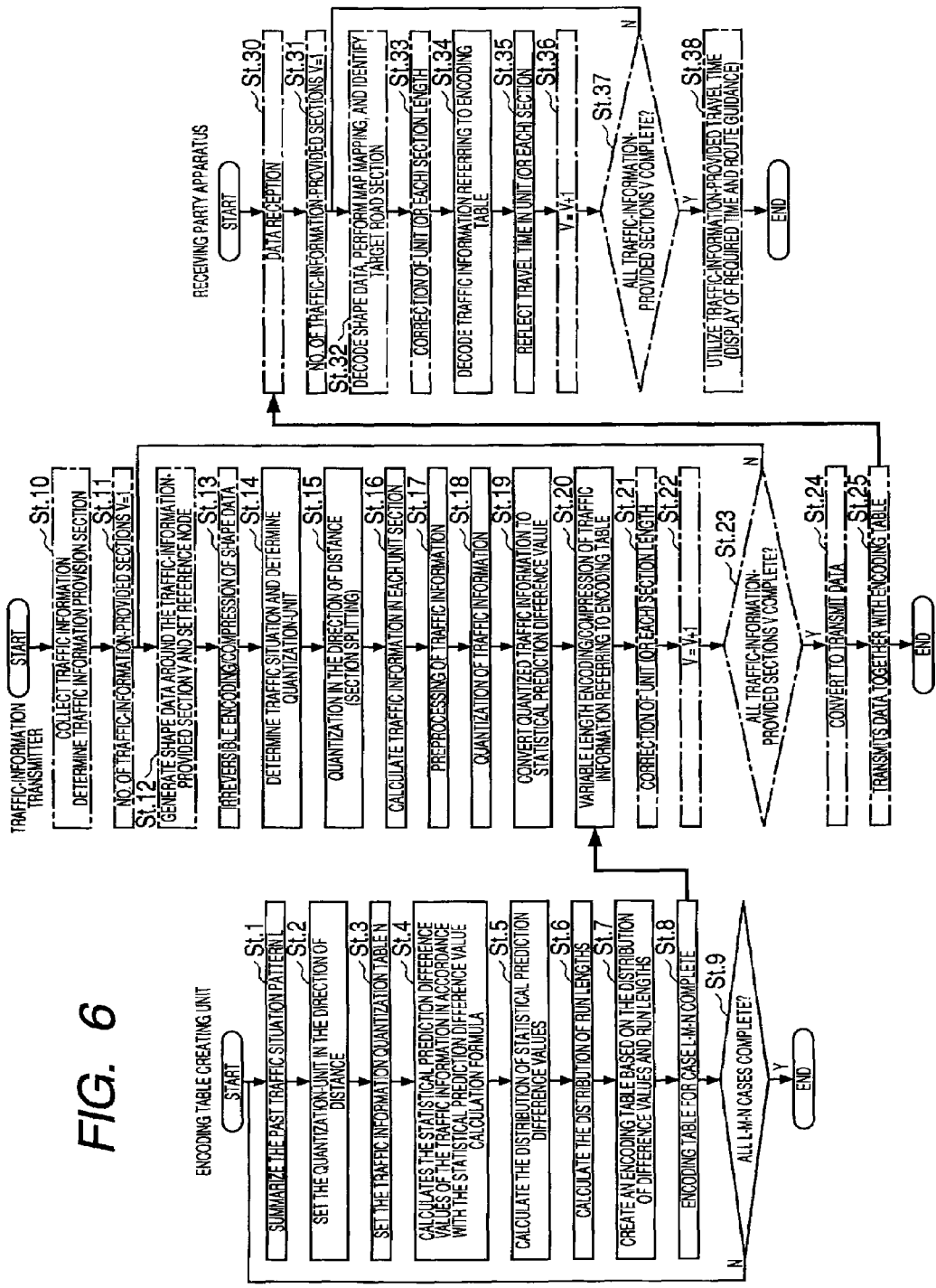
FIG. 6 is a flowchart of operation of a system in the first embodiment of the invention.

The flowchart of FIG. 6 shows the operation of each part of the system.

The encoding table calculating unit 51 of the encoding table creating unit 50 analyzes the past traffic information transmitted from the traffic information measurement apparatus 10 to summarize the traffic information of the traffic situation of pattern L (step 1), set the quantization-unit in the direction of distance (sampling point interval) M (step 2), and set the traffic information quantization table N (step 3). Then, the encoding table calculating unit 51 calculates the statistical prediction difference values of the traffic information (step 4). Next, the encoding table calculating unit 51 calculates the distribution of statistical prediction difference values (step 5) and calculates the distribution of run lengths (continuous distribution of same value) (step 6). The encoding table calculating unit 51 creates an encoding table based on the distribution of statistical prediction difference values and run lengths (step 7) to complete the encoding table for case L-M-N (step 8). The encoding table calculating unit 51 repeats the processing until all cases of L-M-N are complete (step 9).

In this way, a large number of encoding tables supporting various traffic situation patterns and resolutions of information representation are previously created and maintained.

Next, the traffic information transmitter 30 collects traffic information and determines a traffic information provision section (step 10). Determining that one traffic information provision section V is to be addressed (step 11), the traffic information transmitter 30 generates a shape data around the traffic information provision section V and sets a reference node (step 12), then performs reversible or irreversible compression of the shape data (step 13). The encoding/compression method is detailed in the Japanese Patent Application No. 2001-134318.

The quantization-unit determination unit 32 determines the traffic situation and determines the sampling interval (unit block length of quantization-unit in the direction of distance) and the quantization level (step 14). This processing is detailed later.

The traffic information converter 33 performs sampling in the direction of distance from the reference node of the shape data by using the determined unit block length and splits the traffic information provision section (step 15), and calculates the traffic information per quantization-unit in the direction of distance (step 16). The traffic information converter 33 then performs preprocessing in order to enhance the compression effect of encoding (step 17). The preprocessing is detailed later.

The traffic information converter 33 performs quantization of traffic information by using the traffic information quantization table 53 determined by the quantization-unit determination unit 32 based on the quantization level (step 18) and converts the quantized traffic information to a statistical prediction difference value (step 19).

Next, the encoder 34 executes variable length encoding/compression of quantized traffic information by using the encoding table 52 determined by the quantization-unit determination unit 32 (step 20). The encoder 34 then corrects the unit block length by using the reference node for correction of relative position (step 21).

This processing is executed for all traffic information provision sections (step 23). The information transmitter 35 converts the encoded data to transmit data (step 24) and transmits the data together with the encoding table (step 25).

FIGS. 8(a) and 8(b) show examples of data structure of shape data string information (a) and traffic information (b). From the traffic information transmitter 30, a shape data encoding table, a traffic information quantization table (FIG. 3) and an encoding table of statistical prediction difference values of traffic information (FIG. 4) are transmitted simultaneously or over an alternate route, on top of the above information.

While the traffic information (FIG. 8(b)), a data item of "Number of quantized unit sections" is provided, an EOD (End of Data) code indicating the end of data in the encoding table may be set as a special code so as to indicate the end of a quantization-unit in the direction of distance in the encoded traffic information data string, instead of the data item.

As shown in the flowchart of FIG. 6, receiving data (step 30), the receiving party apparatus 61 determines that one traffic information provision section V is to be addressed (step 31). The decoder 62 decodes the shape data. The map matching/section determination unit 63 performs map matching on its digital map database 65 to identify the target road section (step 32) and corrects the unit block length by using the reference node for correction of relative position (step 33).

The decoder 62 decodes traffic information referring to the encoding table (step 34). The traffic information reflecting unit 64 reflect the decoded travel time in the link cost of the local system (step 35). This processing is executed for all traffic information provision sections (steps 36, 37). The Information utilization unit 67 utilizes the provided travel time to execute required time display and route guidance (step 38).

<Method for Determining the Quantization-Unit>

The procedure where the quantization-unit determination unit 32 of the traffic information transmitter 30 determines the traffic situation to determine the sampling point interval (unit block length of quantization-unit in the direction of distance) and the quantization level (step 14) in the processing in FIG. 6 is described below.

The quantization-unit determination unit 32 determines the traffic situation and determines the resolution of information representation so that the transmit data volume of traffic information will not exceed the transmission path capacity of the traffic information transmitter 30. The resolution of information representation has position resolution and traffic representation resolution as its factors. The position resolution is determined by the interval of sampling points (unit block length of quantization-unit in the direction of distance) in sampling. The traffic representation resolution is determined by the quantization level indicating the coarseness of quantization which is determined by the selected quantization table. The quantization-unit determination unit 32 determines the sampling interval and the quantization table in the course of determination of information representation resolution.

In case the sampling interval is smaller, the traffic information is more detailed but the data volume is larger. In case the sampling interval is larger, the traffic information is less detailed but the data volume is smaller. Similarly, in case a quantization table is used to quantize the state quantity of traffic information, the traffic information can be represented in detail but the data amount is large. Use of a coarse quantization table results in less detailed traffic information and a smaller data volume.

The quantization-unit determination unit 32 predicts the transmit data volume of traffic information from the current traffic situation and adjusts the resolution of information representation so that the transmit data volume will not exceed the transmission path capacity. In this practice, the quantization-unit determination unit 32 considers the importance of traffic information of each route to determine the sampling interval and quantization table representing the traffic information of each route, and determines the encoding table corresponding to the sampling interval and quantization table as well as the traffic situation pattern.

Figure 9:
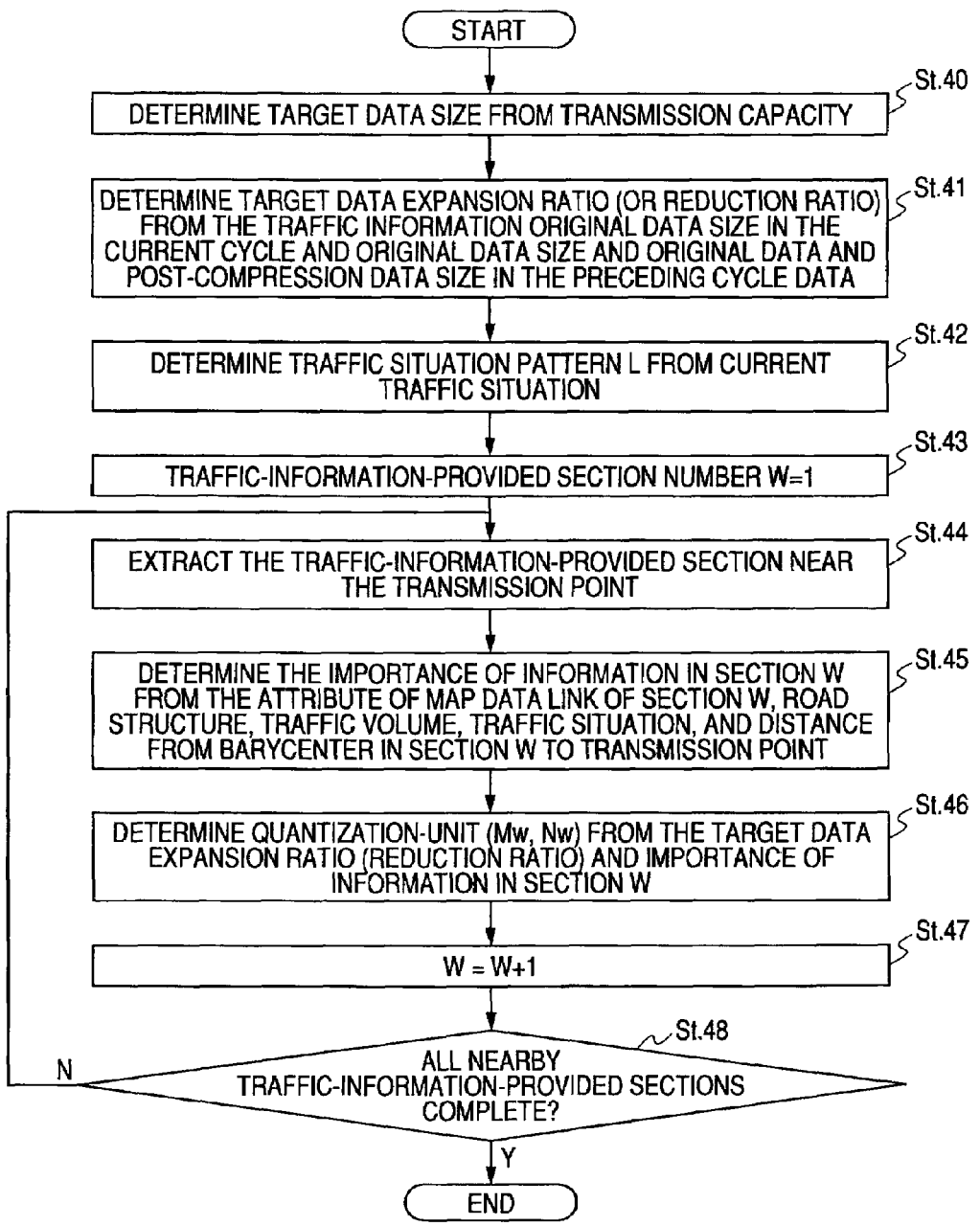
FIG. 9 is a flowchart of a quantization-unit determination procedure in the first embodiment of the invention.

The flowchart of FIG. 9 shows an example of processing by the quantization-unit determination unit 32.

The quantization-unit determination unit 32 determines the target data size so that the transmit data volume will not exceed the transmission path capacity of the traffic information transmitter 30 (step 40). The quantization-unit determination unit 32 calculates the approximate post-coding data size of the original information transmitted from the traffic information measurement apparatus 10 in this cycle (FIGS. 7($a$) and 7($b$)) based on the ratio of the data size of the original information transmitted from the traffic information measurement apparatus 10 in the last cycle (FIG. 7($a$)) to the data size of transmit data sent which is obtained by encoding the original data (FIGS. 8($a$) and 8($b$)), and accordingly determines the expansion ratio (or reduction ratio) of the target data (step 41).

The quantization-unit determination unit 32 determines the traffic situation pattern L (step 42).

The quantization-unit determination unit 32 extracts one traffic information provision section W around the transmission point where the traffic information transmitter 30 is transmitting traffic information (steps 43, 44) and determines the importance of information of the traffic information provision section W from the attribute of a map data link of the traffic information provision section W (such as road type/road number/number of intersections per unit length), road structure such as road width, traffic volume, traffic situation (such as congestion), and the distance between the barycenter position and the transmission point (step 45).

The quantization-unit determination unit 32 obtains an increment/decrement value in the column where the importance of information obtained in step 45 crosses the expansion ratio (or reduction ratio) of target data obtained in step 41 from the table in FIG. 10($a$), and adds the increment/decrement value to the default value of the information representation rank (quantization-unit rank) corresponding to the importance of information to calculate the quantization-unit rank. Then, the quantization-unit determination unit 32 determines the sampling point interval (quantization-unit in the direction of distance) $M_W$ and the traffic information quantization table $N_W$ corresponding to the quantization-unit rank from the table in FIG. 10($b$) (step 46). The quantization-unit determination unit 32 uses the encoding table of L-$M_W$-$N_W$ for encoding of traffic information of the traffic information provision section W.

This processing is performed for all traffic information provision sections around the transmission point (steps 47, 48).

With this processing, it is possible to dynamically change the sampling point interval and quantization level in accordance with the transmit data volume and the importance of information in the traffic information provision section. In the case of an FM multiplex broadcast, for example from the Tokyo Broadcast Station, information is provided so that the information on the Tokyo metropolitan area will be more detailed and information on the adjacent prefectures will be less detailed. For information provision by way of a beacon, information is provided so that information around a point where a beacon is installed will be more detailed and information will be less detailed with distance from the point. In this way, it is possible to change the sampling point interval and the quantization level in accordance with the distance from the information provision point or information provision area.

Figure 11:
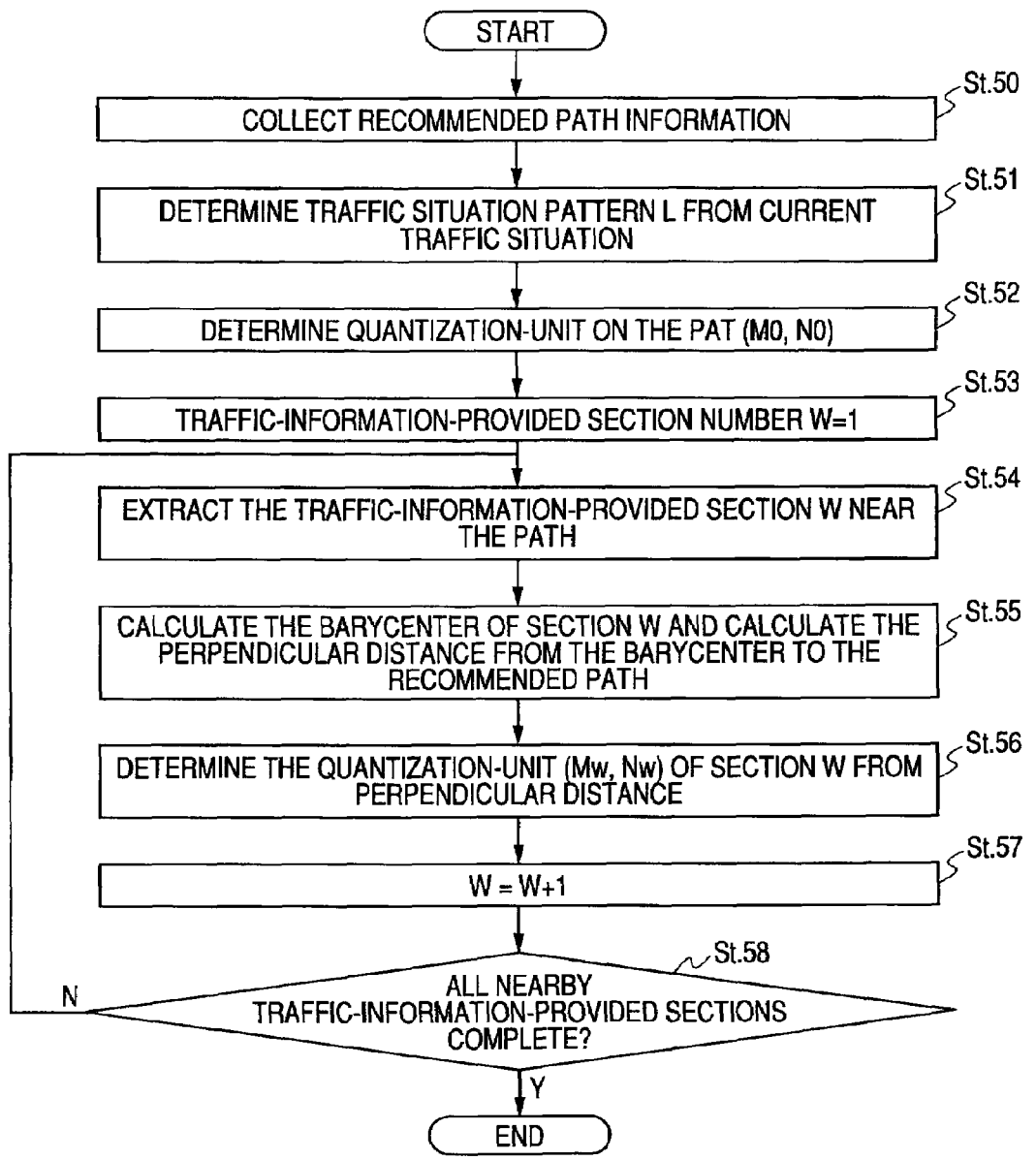
FIG. 11 is a flowchart of a quantization-unit determination procedure which is based on the distance from a recommended path in the first embodiment of the invention.

The flowchart of FIG. 11 shows a method whereby, in case a recommended path is calculated in the center and the recommended path and the traffic information of adjacent areas are provided, the resolution of the traffic information of the recommended path becomes more detailed and the resolution of the adjacent areas off the recommended path becomes less detailed with distance from the recommended path.

The quantization-unit determination unit 32 collects the information on the recommended path (step 50), determines the traffic situation pattern L (step 51) and determines the quantization-unit in the direction of distance $M_0$ and the traffic information quantization table $N_0$ corresponding to rank 1 from the table in FIG. 10($b$) (step 52).

The quantization-unit determination unit 32 extracts one traffic information provision section W around the recommended path (steps 53, 54), calculates the barycenter of the traffic information provision section W, and calculates the distance of the perpendicular from the barycenter to the recommended path (step 55). From the distance of the perpendicular, the quantization-unit determination unit 32 determines the quantization-unit in the direction of distance $M_W$ in the traffic information provision section and the traffic information quantization table $N_W$.

This processing is performed for all traffic information provision sections around the recommended path (step 58).

In this way, the quantization-unit determination unit 32 determines the resolution of information representation in accordance with the importance of traffic information provided.

<Preprocessing>

The traffic information converter 33 performs preprocessing of smoothing the data of traffic information prior to quantization of traffic information so as to enhance the compression effect.

Figure 12:
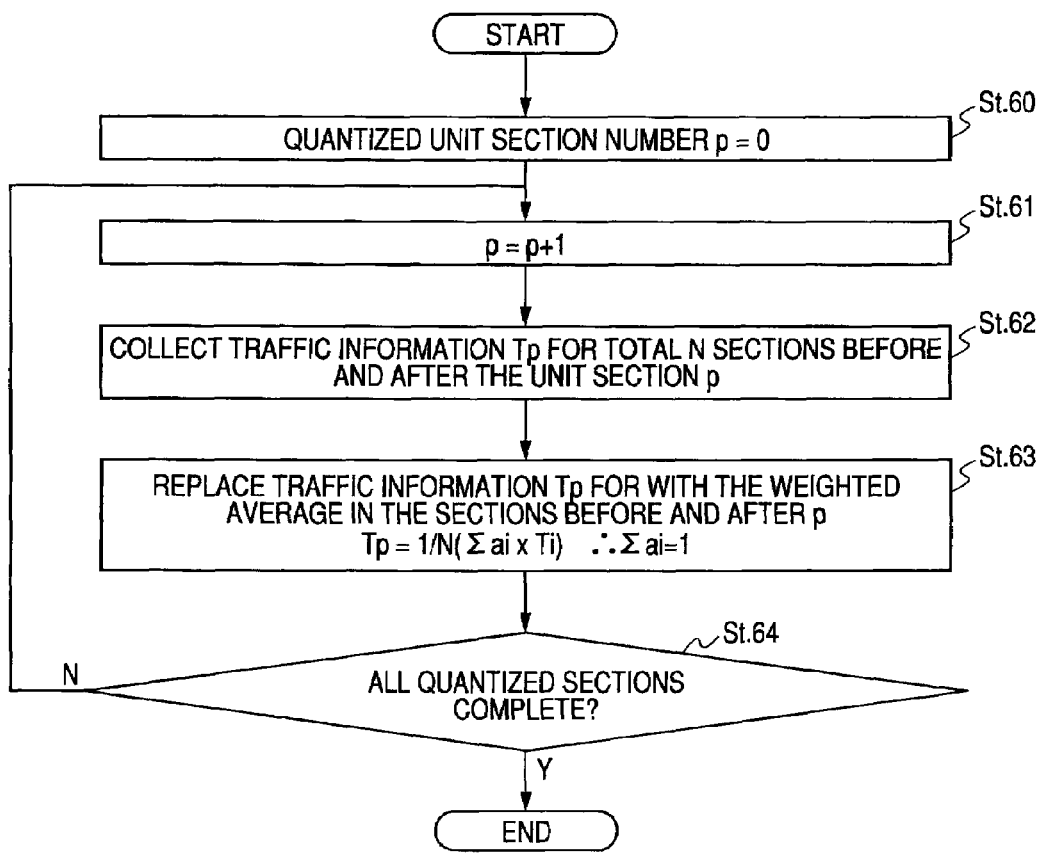
FIG. 12 is a flowchart of a preprocessing procedure in the first embodiment of the invention.

The flowchart of FIG. 12 shows the preprocessing procedure of obtaining the weighted average of data in the adjacent section N to smooth the data.

The traffic information converter 33 focuses on the section p (steps 60, 61). Then the traffic information converter 33 collects the traffic information Tp of each of the total N sections starting with the section p and those immediately before and after p, in order from the first section of the quantization-unit in the direction of distance (step 62). The traffic information converter 33 then replaces the traffic information Tp in the section p with the weighted average of the traffic information of the N sections calculated using the following formula (step 63):

$Tp=(\Sigma ai \times Ti)/N$ where $\Sigma ai=1$

This processing is performed for all quantization-units in the direction of distance (step 64).

The above preprocessing helps represent the overall trend of traffic situation changing microscopically. With this preprocessing, the statistical prediction difference value after quantization concentrates around 0 thus enhancing the compression effect of encoding.

In case congestion information is displayed, a microscopic change in the traffic information of some sections may be neglected without imposing inconvenience on the user of information.

Figure 13A:
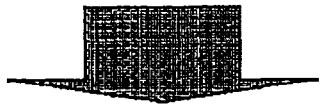
FIGS. 13(a) and 13(b) show a peak and a dip in the first embodiment of the invention.
Figure 13B:

As shown in FIG. 13(a), in case data of some sections are larger than that of the preceding and subsequent sections and the difference exceeds a prespecified value, the sections are called a peak. As shown in FIG. 13(b), in case data of some sections are smaller than that of the preceding and subsequent sections and the difference exceeds a prespecified value, the sections are called a dip. On the congestion information display, information of a short peak or dip section can be neglected.

Figure 14:
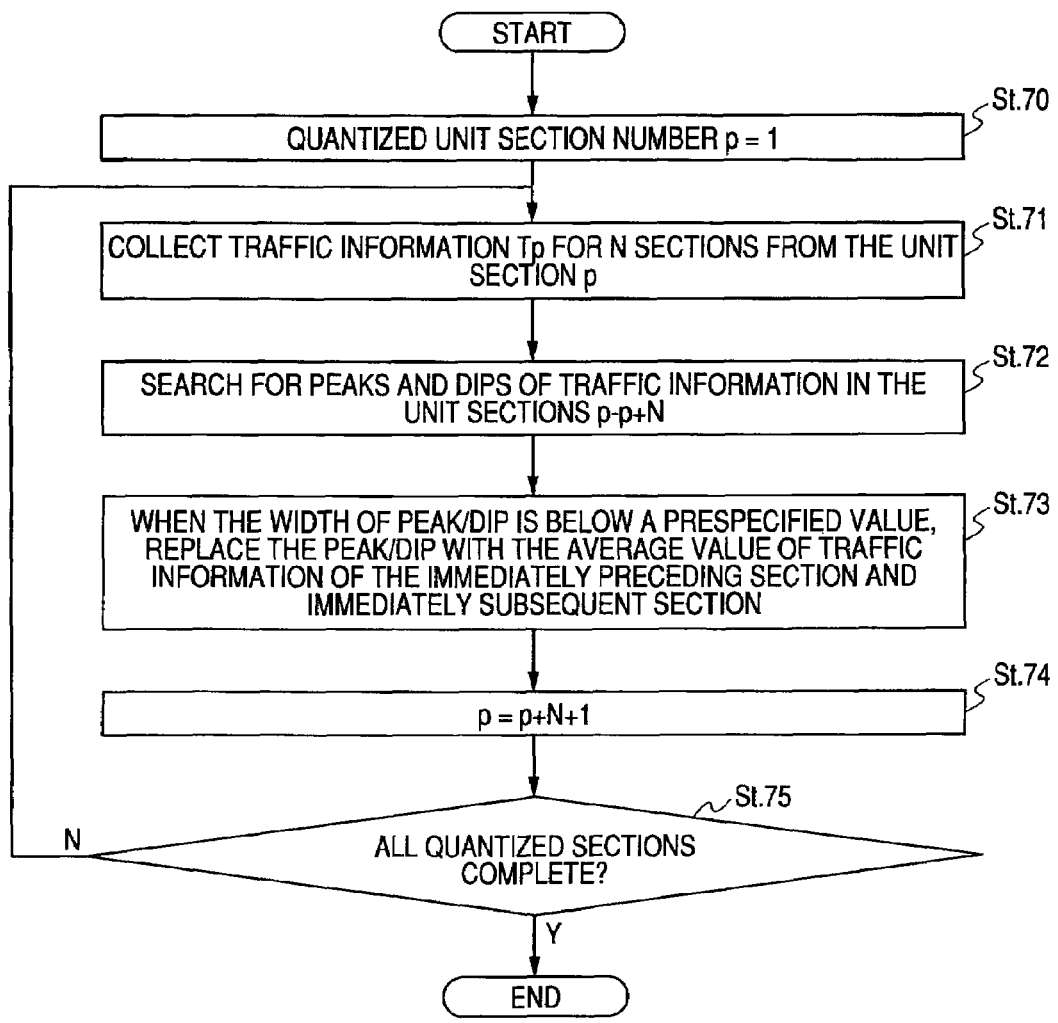
FIG. 14 is a flowchart of a procedure to delete a peak and a dip in the first embodiment of the invention.

The flowchart of FIG. 14 shows the preprocessing method used in this case.

The traffic information converter 33 focuses on the section p (steps 70, 71). Then the traffic information converter 33 collects the traffic information Tp of each of the total N sections starting with the section p, in order from the first section of the quantization-unit in the direction of distance (step 71). The traffic information converter 33 then searches for peaks and dips in the section p through section p+N (step 72). When the width of a peak or a dip is below a prespecified value, the traffic information converter 33 replaces the peak or dip with the average value of traffic information of the immediately preceding section and immediately subsequent section (step 73).

Search for peaks and dips is performed in the following procedure:

1. Calculate the average value and standard deviation of the traffic information of the sections p through p+N.
2. Calculate the deviation value of the traffic information Tp+I of each section.
3. In case the deviation value is more than or less than a prespecified value, Tp+I is determined as a peak or a dip.

With this preprocessing, it is possible to enhance the compression effect of encoding of traffic information thus reducing the transmission data volume.

<Variation Example>

A case has been described where a fixed value (for example in units of 100 m) is set to the sampling point interval (unit block length of quantization-unit in the direction of distance) and sampling is performed in equal intervals (fixed-value intervals) in the direction of distance from the reference node of a shape data. A case is also allowed where the amount of splitting between the beginning and the end of a shape data is specified and the distance between the beginning and the end is split in equal intervals to set a quantization-unit in the direction of distance. In this case, the traffic information data (FIG. 8(b)) includes the data of the reference node number at the end, the reference node number at the beginning, and the amount pf splitting from the beginning to the end. Receiving this data, the receiving party calculates the unit block length of the quantization-unit in the direction of distance by dividing the distance between the reference node at the beginning and reference node at the end by the amount of splitting.

It is possible to use a section between component points such as nodes and interpolation points included in a shape data as the quantization-unit in the direction of distance of traffic information. In this case, the distance between the component points after compression/coding of a shape data is used as a section of quantization-unit in the direction of distance. The quantization-unit in the direction of distance does not have an equal interval although variable length encoding is available by representing a travel time (or a travel speed) by a difference from the traffic information of an adjacent quantization-unit in the direction of distance.

In case traffic information is generated using the method of the embodiment of the invention, quantization is preferably performed so that quantization will be more minute as the speed becomes lower and coarser as the speed becomes higher, as shown in FIG. 3. The travel time is in inverse proportion to the speed so that a small change may have a great influence at low speeds. To smooth an error assumed after conversion to a travel time, geometric discrete values are preferably used to represent a speed quantization table.

<Types of Road Section Reference Data>

Figure 45A:
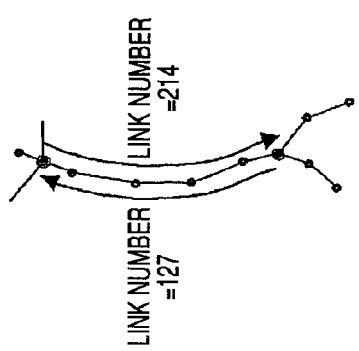
FIGS. 45(a) to 45(c) show road section reference data.

While a case has been described where a shape data string is transmitted to a receiving party and the receiving party references the shape data string to identify the target road section of traffic information, data other than the shape data string may be used as data to identify the road section (road section reference data). For example, as shown in FIG. 45(a), it is possible to use a road section identifier (link number) or intersection identifier (node number) uniformly defined.

In case both of the sending party and receiving party reference the same map, the providing party may transmit the latitude/longitude data to the receiving party and the receiving party may use the data to identify the road section.

Figure 45B:
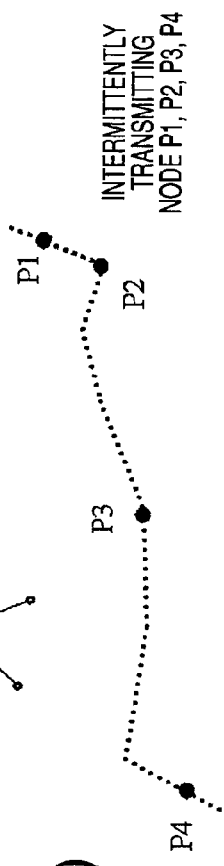
Figure 45C:
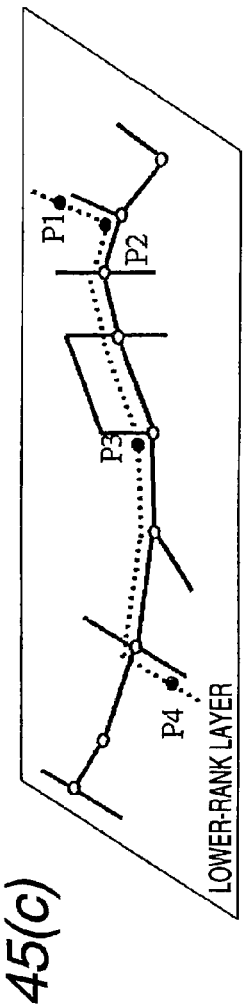

As shown in FIG. 45(b), it is possible to transmit to the receiving party the latitude/longitude data (having attribute information such as name and road type) for reference of positions of intermittent nodes P1, P2, P3 and P4 in order to communicate the target road. In this example, P1 is a link midpoint, P2 an intersection, P3 a link midpoint, and P4 a link midpoint. The receiving party identifies the position of each of P1, P2, P3 and P4 then links the sections by way of path search to identify the target road section, as shown in FIG. 45(c).

As road section reference data to identify the target road, it is possible to use an identifier assigned to each of a tile-shaped segments on a road map, a kilo post on the road, a road name, an address or a zip code, on top of the aforementioned shape data string, road section identifier and intersection identifier, to identify the target road section of traffic information by way of such road section reference data.

Second Embodiment

<Difference Representation of Prediction Information>

A second embodiment of the invention pertains to generation of prediction information of traffic information. To represent prediction information by difference, two methods are available as schematically shown in FIG. 15.

The first method is a method whereby the difference in the direction of distance in the traffic information of the time zone N+1 (a) is calculated (d) and the information on this difference (change point) is encoded. This approach is the same as the encoding of current information described in the second embodiment.

The second method is a method whereby the difference between the traffic information of the time zone N+1 (a) and the traffic information of the preceding time zone N (b) is extracted (c), and the difference in the direction of distance is calculated based on the extracted difference for later encoding (e).

Which of the first and second methods is more advantageous in terms of reduction of data volume depends.

Generally speaking, congestion is headed by a bottleneck intersection (such as Harajuku Intersection and Hatano Bus Stop on Tomei Expressway) and its tail extends or shrinks, and especially in case the time difference of time zones N and N+1 is small, the tail of congestion remains unchanged in most cases. Thus the second method is more advantageous. However, in case two occurrences of congestion have merged into a single occurrence of congestion, or in case both head and tail of congestion changes, the total number of change points is larger in the second method (e) so that the first method proves more advantageous. Selection of either method should be made on a case-by-case basis. The best approach is to select between the first and second method, on a per traffic information provision section basis, depending on the time difference up to the predicted time zone or change in the traffic situation.

The first method has been described in the first embodiment. In the second embodiment, generation of traffic information using the second method is described.

<Coding of Prediction Information>

FIG. 16(a) shows the traffic information in the current information in each quantization-unit in the direction of distance and prediction information in the next time zone.

The traffic information in the current information and prediction information is quantized by using a quantization table (FIG. 16(b)).

Next, the prediction information is represented by the difference from the current information (FIG. 16(c)). In this practice, data increases where the value of prediction information concentrates around ±0 from Correlation Law B. In FIG. 16(c), the value of current information is represented by the difference from the value (assumed as a statistical prediction value) in the adjacent quantization-unit in the direction of distance.

Next, the prediction information is represented by the difference from the statistical prediction value (FIG. 16(d)).

In this practice, many of the statistical prediction difference values of prediction information concentrate around ±0 from Correlation Law C.

In the processing in FIG. 16(c), calculating the difference by subtracting the prediction information from the current information obtains the same result. Representation in reverse chronological direction is also possible.

The statistical prediction difference value of each of the current information and prediction information is encoded by using an encoding table. As shown in FIG. 17(a), the encoding table for encoding the statistical prediction difference value of the current information is the same as that in the first embodiment (FIG. 4). The encoding table for encoding the statistical prediction difference value of the prediction information is the same as that for the current information except that no special codes are used, as shown in FIG. 17(b).

<System Configuration>

Figure 18:
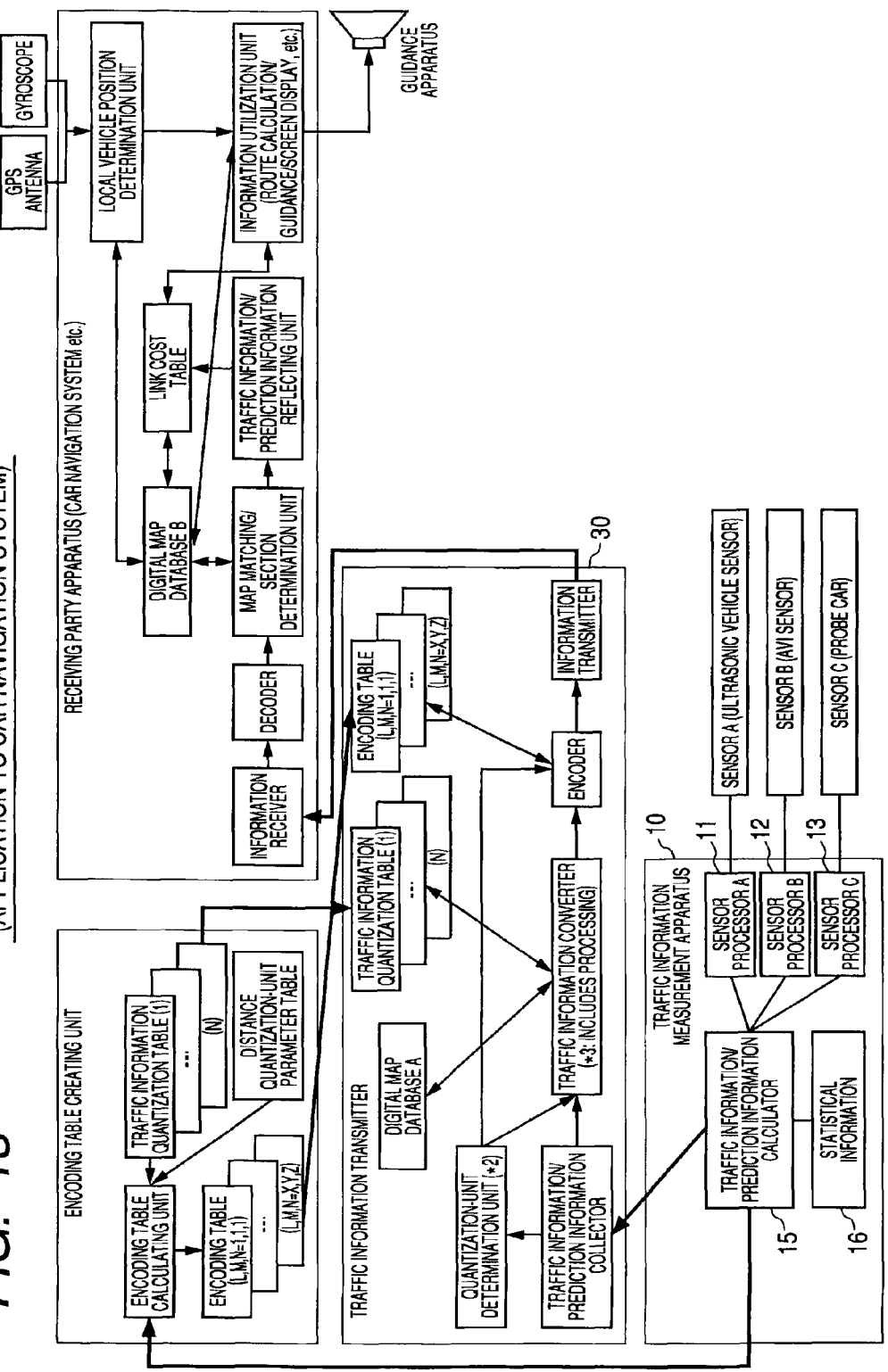
FIG. 18 is a system block diagram in a second embodiment of the invention.

FIG. 18 shows a broadcast-type traffic information provision system which generates and provides traffic information including prediction information. The traffic information measurement apparatus 10 of this system comprises a traffic information/prediction information calculator 15 for generating current information of traffic information by using the data processed by the sensor processors 11, 12, 13, generating prediction information by using the statistical information 16, and outputting these traffic information data and data indicating the target section. The remaining configuration is the same as that in the first embodiment (FIG. 5).

Figure 19:
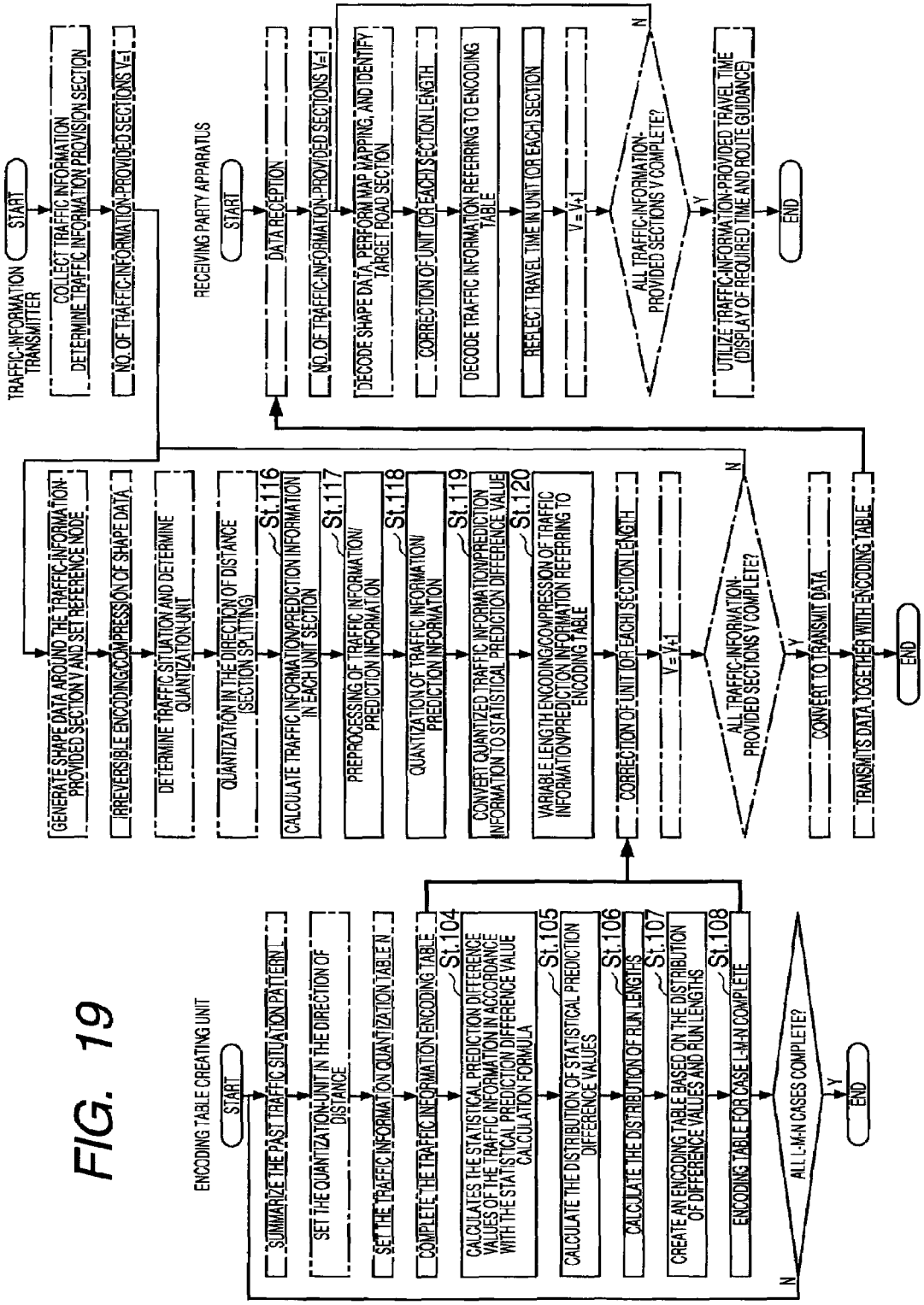
FIG. 19 is a flowchart of operation of a system in the second embodiment of the invention.

The flowchart of FIG. 19 shows the operation of each section of this system. The processing in the encoding table creating unit is different from the processing in the first embodiment (FIG. 6) in that a process of creating an encoding table used for encoding of prediction information (steps 104 through 108) is added. The processing in the traffic information transmitter is different from the processing in the first embodiment (FIG. 6) in that prediction information data is encoded as well as current information. The remaining operation is the same.

FIGS. 20(a) and 20(b) show a data structure of shape data string information (a) and traffic information (b) transmitted from the traffic information transmitter 30. The shape data string information (a) is the same as that in the first embodiment (FIG. 8(a)). For the traffic information (b), the asterisked data is different from the data in the first embodiment (FIG. 8(b)). An identification code to specify the encoding table of prediction information, information to indicate the valid time zone of prediction information, and encoded prediction information data are added. The prediction information includes a plurality of data items whose valid time zones differ from each other. From the traffic information transmitter 30, a shape data encoding table, a traffic information quantization table, an encoding table of statistical prediction difference values of traffic information (FIG. 17(a)), and an encoding table of prediction information (FIG. 17(b)) are transmitted simultaneously or over an alternate route, on top of the shape data string information (a) and traffic information (b).

<Change in Resolution of Prediction Information>

The prediction information may be provided at a lower resolution as the prediction time advances into future, since prediction accuracy drops as prediction pertains to farther future.

Figure 21A:
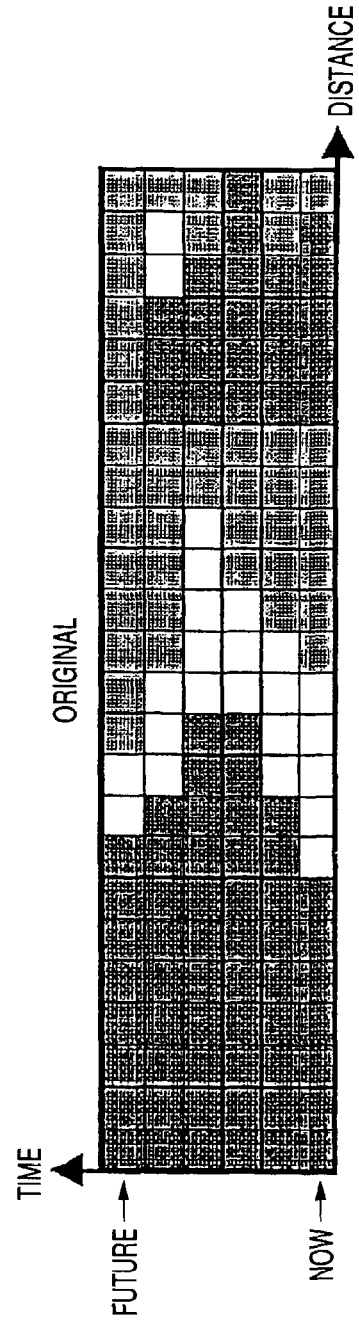
FIGS. 21(a) and 21(b) illustrate a change in information representation resolution of prediction information in the second embodiment of the invention.
Figure 21B:
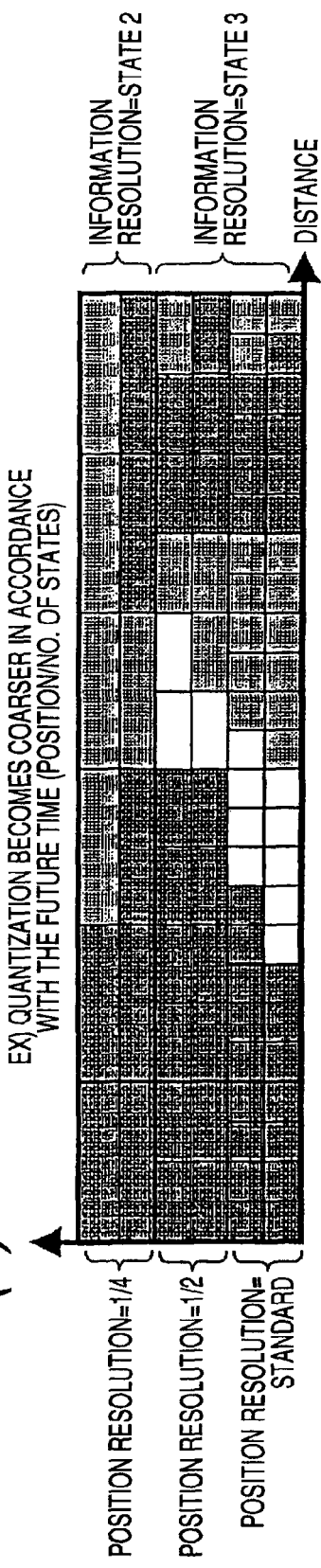

FIG. 21(b) schematically shows the provision of information where the position resolution is lowered and the traffic representation resolution is also lowered from the original information (FIG. 21(a)) in accordance with the future time. In case the position resolution is lowered, a plurality of quantization-units in the direction of distance are merged into a single quantization-unit in the direction of distance and the average value of data in each quantization-unit in the direction of distance is used as the data in the resulting quantization-unit in the direction of distance.

In case the traffic representation resolution is lowered, a coarse quantization table is used to quantize data.

FIGS. 22(a) to 22(f) show a case where the statistical prediction difference value of prediction information is obtained while the position resolution is lowed from the original prediction information (a) and while the traffic information resolution is lowered by using a quantization table specifying coarseness at multiple levels shown in FIG. 23. In FIG. 22(b), the position resolution is lowered to half. An average traffic information value is obtained and the faction is dropped.

In FIG. 22(c), the quantization table of "quantized volume (current)" in FIG. 23 is used to quantize prediction information and current information. In FIG. 22(d), the quantization table of "quantized volume (prediction 1)" in FIG. 23 is used to further quantize prediction information and lower the traffic representation resolution off prediction information. In FIG. 22(e), the difference between the current information quantized by using the quantization table of "quantized volume (prediction 1)" and the prediction information in FIG. 22(d) is extracted.

In FIG. 22(f), a statistical prediction difference value is calculated assuming the value in the adjacent quantization-unit as a statistical prediction value concerning the prediction information obtained in FIG. 22(e) and the current information obtained in FIG. 22(c) (current information quantized by using the quantization table of "quantized volume (current)".

While both of the position resolution and traffic representation resolution are modified in this example, resolution of either one may be lowered.

While the position resolution of prediction information is lowered to half (the unit block length is doubled) in this example, it is possible to set the unit block length to any value exceeding 1.0 times (practically, setting of 1.5 times or 1.25 times is adequate since calculation would be otherwise complicated).

While the traffic representation resolution of prediction information is also lowered to half in this example, arbitrary setting is possible in the direction resolution gets coarser, although calculation is more complicated. The fraction at the tail in the direction of distance is difficult to calculate so that the "coarsest unit block length" is previously calculated and the unit block length is split by $2^N$ from a practical point of view.

The procedure of decoding is shown by ① through ⑧ in the rightmost area of FIG. 22.

FIG. 24 shows a data structure of traffic information assumed in case the resolution of prediction information is modified. For the prediction information in each valid time zone, a position resolution identification code (code indicating that the unit block length extends p times) and a quantization table number.

In this way, for the prediction information, the resolution of information representation is modified in accordance with the future time of prediction to reduce the transmit data amount.

Variation Example

Figure 25:
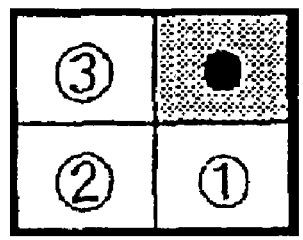
FIG. 25 shows an example of another statistical prediction value in the second embodiment of the invention.

While a case has been described where a value in an adjacent quantization-unit in the direction of distance is used to calculate a statistical prediction difference value in this example, the statistical prediction value in a quantization-unit marked with a bullet may be set as follows considering both space and time, as shown in FIG. 25:

Statistical prediction value=a①+b②+c③ (where a+b+c=1)

Or =(①+③)÷2

Third Embodiment

A third embodiment of the invention pertains to a method for performing orthogonal transformation on the traffic information represented by a function of distance from the reference node to decompose the information into frequency components and representing the traffic information by the coefficient of each frequency component.

Approaches to perform orthogonal transformation on chronological data and convert the data to a coefficient of frequency component include FFT (fast Fourier Transform), DCT (discrete cosine transform), and wavelet transform. The FFT (fast Fourier Transform) which is the most popular is described below.

The Fourier Transform is a transform process which uses a finite number of discrete values (sample values) to obtain a Fourier coefficient. The Fourier Transform refers to a process where a complex function C is associated with a discrete value represented by a complex function f:

$C(k)=(1/n)\Sigma f(j)\cdot\omega^{-jk}$ (k=0, 1, 2, ..., n−1) (For Σ, add from j=0 to n−1)　　(Formula 1)

Note that $\omega=\exp(2\pi i)$. C8k) is called a Fourier coefficient. N is an order.

Conversely, a process where a complex function C is associated as shown below is called the inverse Fourier transform.

$f(j)=\Sigma C(k)\cdot\omega^{jk}$ (j=0, 1, 2, ..., n−1) (For Σ, add from k=0 to n−1)　　(Formula 2)

In the Fourier Transform, in case the following hold for a discrete value which the function f(j) takes on, the FFT (fast Fourier Transform) is available. Various FFT algorithms are proposed.

Sampling interval δ=constant $n=2^N$

Figure 26:
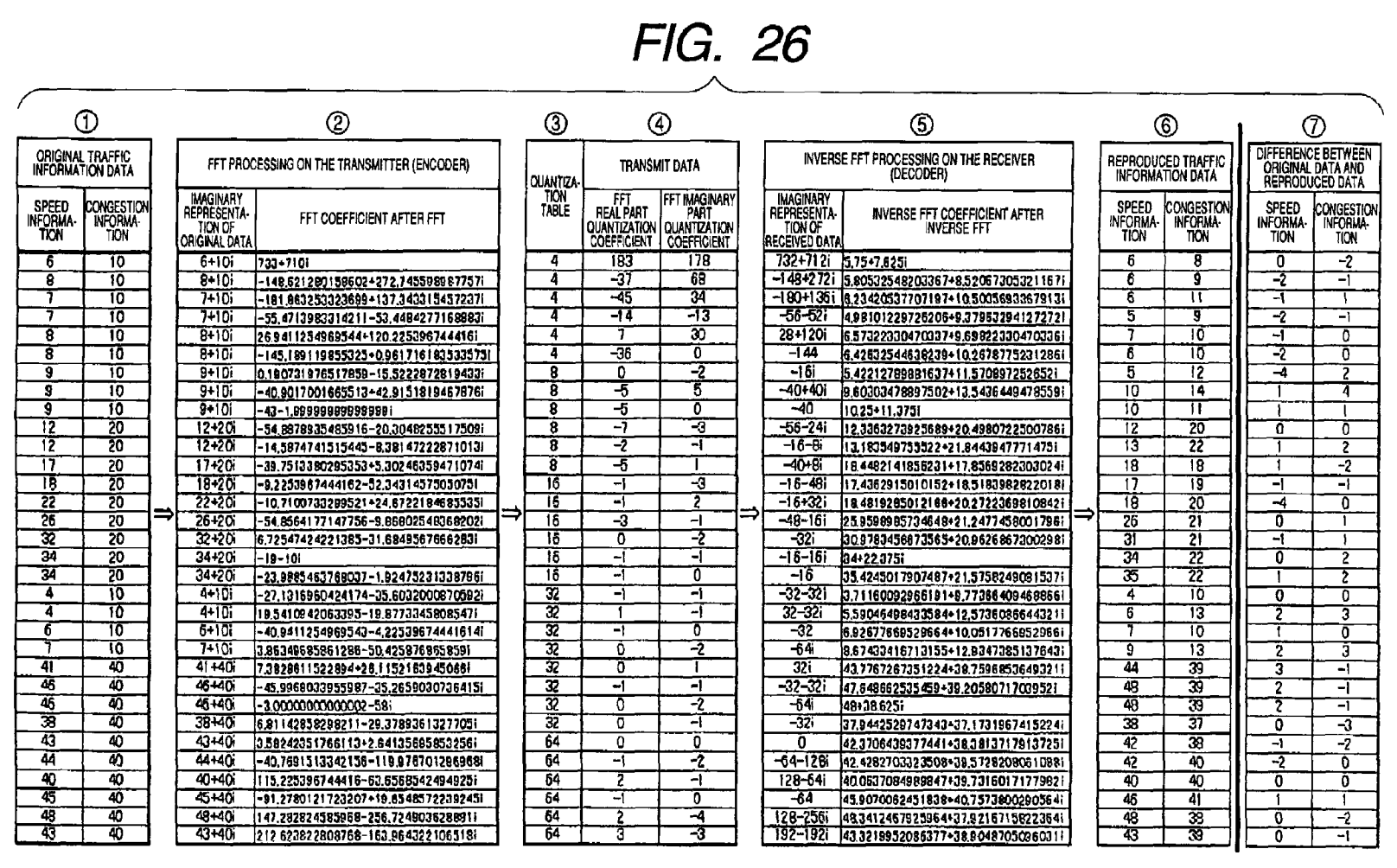

FIG. 26 shows an example of experiment where traffic information is actually represented by a Fourier coefficient. Through this experiment example, the method for generating traffic information represented by a Fourier coefficient is described below.

① "Original traffic information data" indicates the state quantity of traffic information at each sampling point (corresponding to the data in FIG. 1(b)). The number of data items is set to $2^5$ (=32) so as to allow FFT. For FFT, it is possible to simultaneously transmit two information items by using the real part and imaginary part of a complex function so that "speed information" is set to the real part while "congestion information" is set to the imaginary part in this example. For FFT, values of comparable level generates less relative errors so that the congestion information is represented by "congestion=10, heavy traffic=20, light traffic=40" in line with the numeric value level of speed information.

② In the FFT processing, the data ① is represented by the imaginary part (a numeric value with "i" affixed at the tail represents an imaginary coefficient) to perform FFT and the FFT coefficient obtained is shown.

③ The quantization table corresponds to the "traffic information quantization table" in encoding/compression. The FFT coefficient under ② is divided by a value in the quantization table (that is, quantized) to obtain "④ transmit data". An FFT coefficient in this table is a coefficient of a low frequency as it is listed in a higher row while it is a coefficient of a high frequency as it is listed in a lower row. Thus, for a coefficient of a low frequency which has a greater influence, a smaller value in "③ Quantization table" is set for more detailed representation. As the frequency rises, a value in "③ Quantization table" is set for coarser representation.

④ The transmit data is obtained by quantizing the FFT coefficient under ② by using the quantization table ③. (In case the value in the quantization table is 64, the real part and imaginary part of the FFT coefficient are divided by 64 and the fractional portion is rounded off.) A higher-frequency component of the transmit data ④ is quantized in a coarser fashion so that the sixth row and after from the top contain smaller relative values, with values concentrating around "0". The transmit data ④ is variable length encoded/compressed then transmitted as mentioned later. (For an FFT coefficient which does not show the regularity, statistical difference processing is not particularly performed.) Resulting values concentrate around "0" which shows the compression effect of variable length encoding. To the receiving party, the quantization table ③ is transmitted also as table information necessary for decoding.

⑤ The inverse FFT performs inverse FFT on the received Fourier coefficient (④). First, the coefficient of each of the real part integer and imaginary part integer of the data received is reproduced based on the value in the "quantization table" ③ (when the value in the quantization table is 64, the real part and imaginary part of the received data is multiplied by 64 and the fractional portion is rounded off.) The resulting value undergoes inverse FFT.

⑥ Reproduced traffic information data is obtained by rounding off the coefficient value of the real part and imaginary part of the inverse FFT coefficient obtained through inverse FFT and reproducing the real part to speed information and the imaginary part to congestion information.

⑦ Difference between original and reproduced data describes the difference between "reproduced data" and "measurement data". Although an error of maximum ±4 does exist, substantially the same value as the original "measurement data" is obtained. Especially for congestion information, an error of such a level can be eliminated in reproduction by previously negotiating "congestion=0–15; heavy traffic=16-25; light traffic=26 or more".

Figure 27:
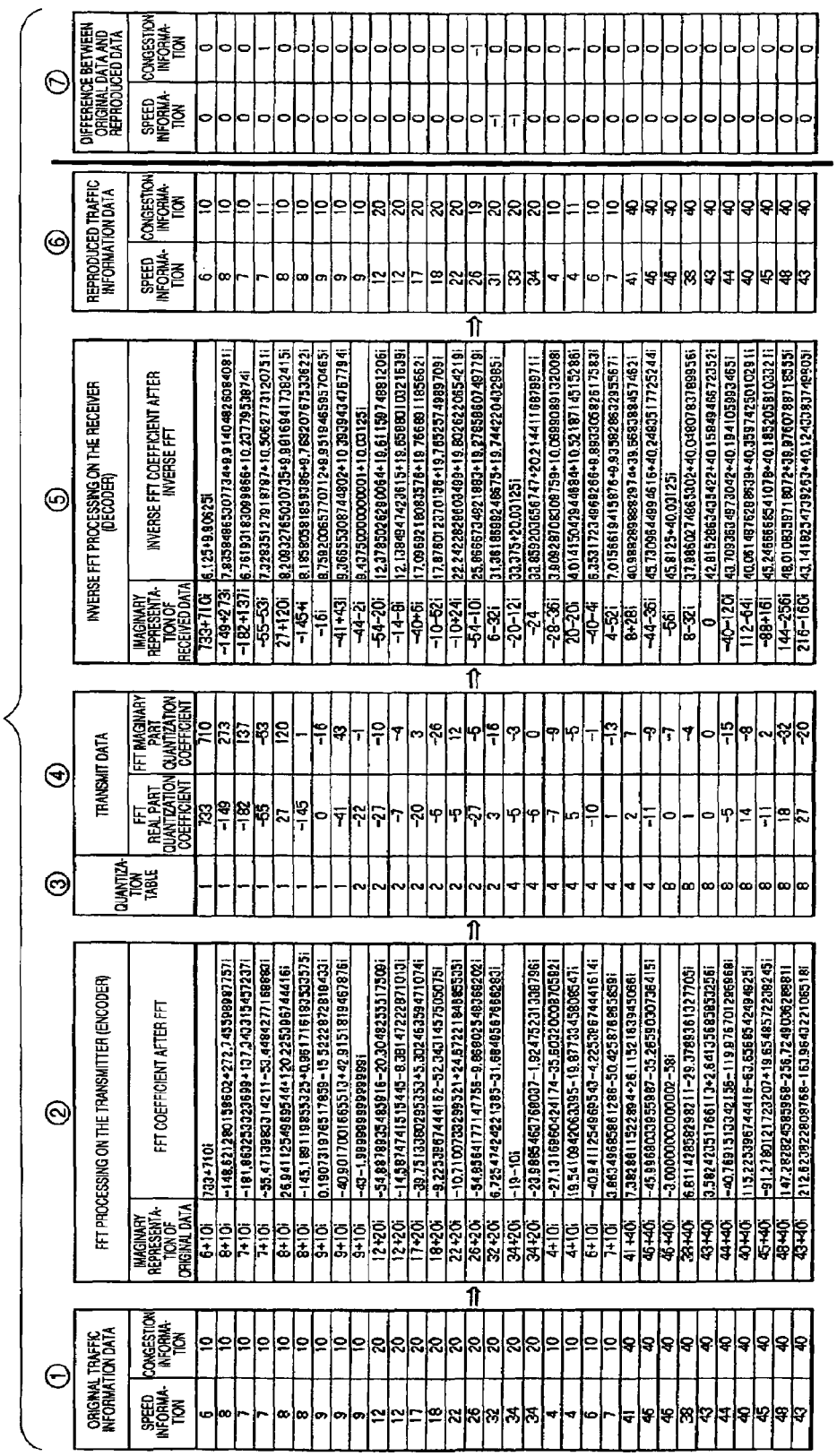
FIG. 27 shows a quantization procedure using FFT with the quantization table modified in the third embodiment of the invention.

FIG. 27 shows a case where the same measurement data as FIG. 26 is set in the quantization table ③ in a detailed fashion so that detailed data will be transmitted, similar to raw data.

The difference between original and reproduced data ⑦ is much smaller than that in FIG. 26 and information is reproduced accurately. Note that the transmit data ④ has a wider high-frequency component range than that in FIG. 26 (variations around ±0 is noticeable). The information volume transmitted is larger and the effect of variable length encoding/compression is not found.

Thus, in case traffic information is transformed to an FFT coefficient and is transmitted, the value in the quantization table may be adjusted to obtain data in the range from "transmit data whose information volume is large but which can accurately reproduce traffic information" to "data whose information volume is small and which reproduces traffic information at a low accuracy". It is thus possible to adjust the information volume while considering the position resolution described in the first embodiment.

The configuration of a system which transforms traffic information to an FFT coefficient and provides the FFT coefficient is the same as that in FIG. 5.

Figure 28:
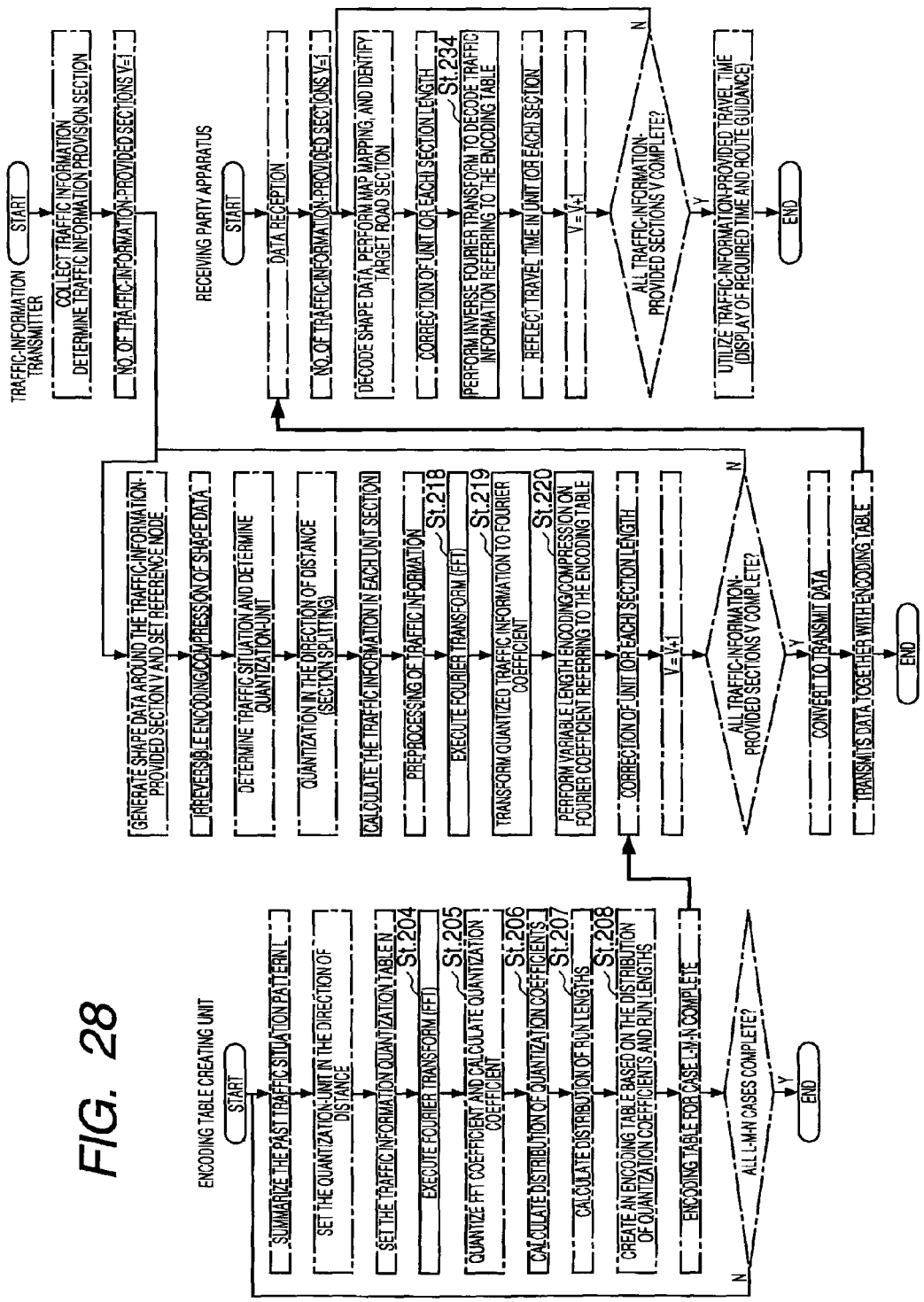
FIG. 28 is a flowchart of operation of a system in the third embodiment of the invention.

The flowchart of FIG. 28 shows the procedure in this system. The encoding table creating unit performs FFT to obtain an FFT coefficient (step 204), quantizes the FFT coefficient to calculate a quantization coefficients (step 205), calculates the distribution of quantization coefficients (step 207), calculates the distribution of run lengths (step 207), and accordingly creates an encoding table (step 208).

The traffic information transmitter performs level alignment of traffic information set to the real part and imaginary part (step 218), performs FFT to transform the data to a Fourier coefficient, (step 219), and performs variable length encoding/compression on the Fourier coefficient (step 220).

The receiving party apparatus references the encoding table and performs inverse Fourier Transform to decode the traffic information (step 234).

The remaining procedures are same as those in FIG. 6.

FIG. 30 shows an encoding table used for encoding. FIG. 29 shows a data structure example of traffic information transmitted from the traffic information transmitter. The traffic information quantization table identification code corresponds to an identification number of the quantization table ③ in FIG. 26. The encoding table identification code represents an identification code in FIG. 30.

For FFT, the number of data items transmitted (equivalent to the number of rows of the table in FIG. 27×2) is normally double the amount of block splitting between reference nodes. In case the high-frequency component is dropped before data is transmitted, the number of data items is different. This is identified by the EOD code in the encoding table. In this practice, the receiving party assumes the Fourier coefficient of the high-frequency component as 0 in decoding.

In this way, by sampling the traffic information in the direction of distance of a shape data indicating a road, decomposing the traffic information function represented by the state quantity of each sampling point into frequency components, and encoding the coefficient value of each frequency and providing the obtained value, the receiver apparatus can reproduce the traffic information.

This method is also applicable to the prediction information f the traffic information. For prediction information, the following approach is possible: the difference between the state quantity of traffic information in the time zone N and the state quantity of the traffic information (prediction information) in the time zone N+1 adjacent in terms of time is obtained. Orthogonal transformation is performed on the difference state quantity at each sampling point to transform the data to the coefficient of each frequency component, and the coefficient value is encoded.

The coefficient value of a high-frequency component among the coefficient values of the frequencies obtained through transform to a frequency component may be quantized to show deviation in the frequency of statistical occurrences and the coefficient value of each frequency after quantization is encoded so as to dramatically reduce the data volume.

The coefficient value of a high-frequency component among the coefficient values of the frequencies obtained through transform to a frequency component may be deleted before encoding.

Fourth Embodiment

A fourth embodiment of the invention pertains to a special data transmission method for transmitting traffic information represented by a Fourier coefficient.

<Transmitting Data by Layer of Frequency in Order From Low Frequencies to High Frequencies>

In this transmission method, traffic information is transmitted using a technique conforming to the progressive transmission system for image information.

In the progressive transmission system for image information, the sending party

① transmits all-pixel data of low frequency components at a time,

② transmits the coefficients of high frequency components, and

③ transmits the coefficients of further high frequency components,

The sending party repeats this processing. At the receiving party where the image is displayed, ① a blurred image is displayed, ② then the image gradually becomes more minute.

In this case, the receiving party can determine an approximate image being sent before receiving all data, however slow the communications speed may be. Thus, the receiving party can determine whether the image is "necessary or not" in an early stage.

This data transmission method is also applicable to traffic information represented by the coefficient of each frequency after transform to a frequency component.

The data transmission method is implemented by hierarchically organizing the coefficient value of each frequency representing traffic information by way of frequency and transmitting the coefficient values on a per layer basis.

FIGS. 31(a) and 31(b) show a data structure assumed when the traffic information is split. FIG. 31(a) shows the basic information and FFT coefficient information of low-frequency components. The information includes the "amount of traffic information splitting" to represent the amount of splitting of components ranging from low frequencies to high frequencies and also the "number of this information" indicating the information's position in the sequence. FIG. 31(b) shows FFT coefficient information of high frequency components as split traffic information. This information also includes the "amount of traffic information splitting" and the "number of this information" although data items overlapping those in FIG. 31(a) are omitted.

In case the traffic information transmission method is applied to provision of traffic information from the Internet, the user wishing to check traffic information on various websites of the Internet can check the general information of a website. The user can omit the details and visit another website. In case the user scrolls through traffic information along an expressway on the Internet, the user can check the general information and omit the details in order to fast scroll through traffic information.

In case the user sequentially scrolls through past traffic information accumulated chronologically like an animation film, the user can proceed frame by frame in case a point of focus is likely not congested.

The coefficient values of the frequencies on a plurality of roads for which information is provided may be transmitted from low frequencies to high frequencies in the order shown by the arrow in FIG. 32(b). FIG. 32(a) shows a normal transmission order for the purpose of comparison.

<Backup Using a Plurality of Transmission Media>

In case the coefficient values of the frequencies are hierarchically organized by frequency and split into low-frequency components and high-frequency components as shown in FIG. 31, traffic information can be transmitted from more than one medium on a per layer basis.

For example, a digital terrestrial broadcast provides shape data (position data) and coarse traffic information (low-frequency components of FFT coefficient) on all target roads in a wide area. A beacon installed beside a road provides information which covers details of the traffic information provided by the digital terrestrial broadcast around the beacon's position.

In this way, a wide-area broadcast-type medium provides public general information to let a beacon provide details on the local area.

Figure 33:
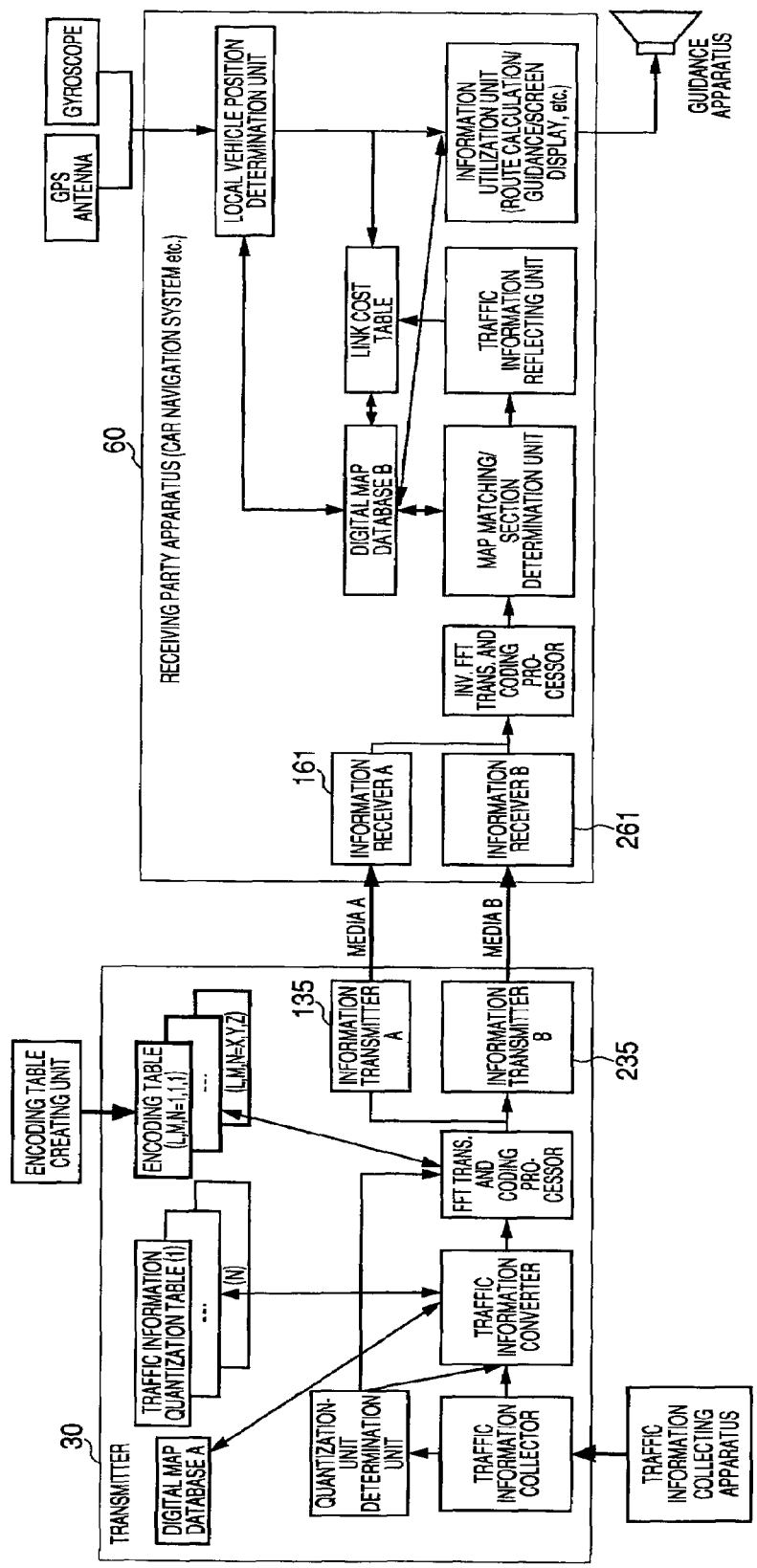
FIG. 33 is a system block diagram in the fourth embodiment of the invention.

FIG. 33 shows a system configuration of this case. A traffic information transmitter 30 comprises an information transmitter A (135) for providing traffic information via a wide-area medium A and an information transmitter B (235) for providing traffic information via a beacon (medium B). A receiving party apparatus 60 comprises an information receiver A (161) for receiving information provided by the wide-area medium A (161) and an information receiver B (261) for receiving information provided by the beacon.

The receiving party apparatus 60 uses the traffic information received by the information receiver A (161) and the traffic information received by the information receiver B (261) to reproduce the traffic information.

In a system where a wide-area medium and a beacon backs each other up to provide traffic information, the wide-area medium need not transmit detailed information thus allowing transmission of traffic information on a wider area. The receiving party apparatus can reproduce necessary traffic information based on the information obtained from a wide-area medium and a beacon at the local site near which the user's vehicle is traveling.

It is possible to provide detailed information as a reply information from a beacon to a car-mounted machine which has provided probe information via a beacon.

While the relation between a wide-area medium and a beacon has been described, any other combination of media which back each other up may be used. A medium such as a cell phone may be used instead of a beacon.

Fifth Embodiment

A fifth embodiment of the invention pertains to a method for providing the latest traffic information by way of difference information from the last traffic information.

In this method, an approach used to calculate the prediction information arranged chronologically on the time axis of future time (approach for obtaining the difference from the latest information in the preceding time zone as well as the difference from the latest information at an adjacent point and encoding the difference value) is applied to calculate the latest information in the time zones arranged chronologically on the real time axis. To calculate the latest information in the current time zone, the difference from the latest information in the preceding zone as well as the difference from the latest information at an adjacent point is obtained and the difference value is encoded.

For the prediction information, the prediction information in each time zone can be displayed in the data format of traffic information in FIG. 20(b) and transmitted. The latest information on the real time axis can be transmitted only when the time has come.

Thus, in his example, the data format of the traffic information shown in FIG. 20(b) is split into a data format of the base traffic information (FIG. 34(a)) and a data format of the traffic information representing prediction information in each time zone (FIG. 34(b)) and the latest information at the point in time is transmitted in the data format of the traffic information shown in FIG. 34(b) when the real time has come.

Such traffic information includes the "amount of traffic information splitting" to represent the amount of splitting and the "number of this information" indicating the information's position in the sequence. In case the amount of splitting is N−1, In the first cycle, the base traffic information from the next cycle to the N−1 cycle is transmitted in the data format shown in FIG. 34(a), together with the shape data string information.

In the second cycle, the latest traffic information represented by the difference value from the information in the first cycle is transmitted in the data format shown in FIG. 34(b).

In the third cycle, the latest traffic information represented by the difference value from the information in the second cycle is transmitted in the data format shown in FIG. 34(b).

In the Nth cycle, the traffic information as the base of the next cycle and after is transmitted in the data format shown in FIG. 34(a), together with the shape data string information.

By doing so, the total information volume is reduced. The receiving party needs to perform a smaller number of map matching processes so that the total performance of the system is enhanced.

In case the history data of traffic information provided in the past is to be stored, the target data volume is small.

In case real time traffic information is provided over the Internet or a service to show the past traffic information chronologically such as on an animation movie, the communications charge on the user is reduced.

Sixth Embodiment

A sixth embodiment of the invention pertains to application of this system to a storage medium.

While the case where the traffic information generated by this invention is transmitted via communications has been described as a main application, the traffic information may be stored onto a storage medium such as a CD or a DVD, or exported to another terminal via a storage medium.

FIG. 35 shows a system configuration of this case. A traffic information converter/recorder 330 comprises an information accumulating unit 335 for accumulating the encoded traffic information. The information accumulating unit 335 accumulates the traffic information encoded by an encoder 34 into an internal storage medium 331 or an external storage medium 332. A traffic information reference/utilization apparatus 360 comprises a decoder 362 for decoding encoded data. The decoder 362 reads the traffic information stored on the external storage medium or internal storage medium 361 and decodes the traffic information.

The method for utilizing the decoded traffic information is the same as that in FIG. 5.

In this way, the traffic information generated by the inventive method can be accumulated into an accumulation medium and utilized.

Seventh Embodiment

A seventh embodiment of the invention pertains to interactive provision of traffic information.

Figure 36:
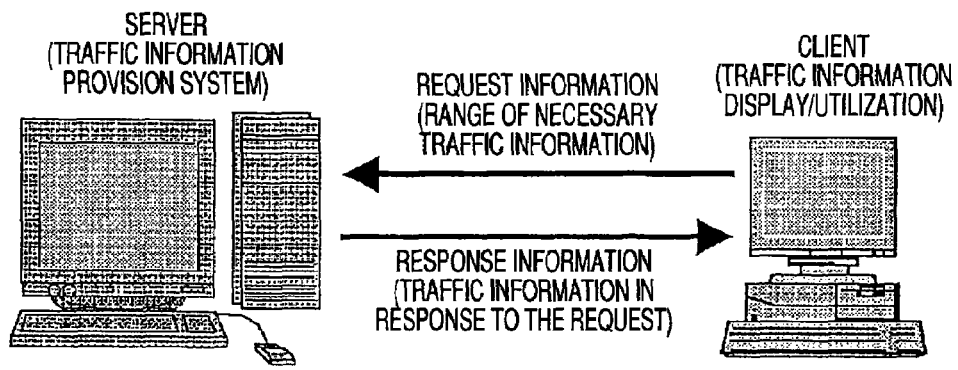
FIG. 36 illustrates an interactive system in a seventh embodiment of the invention.

In this system, as shown in FIG. 36, a client specifies the range of traffic information and data volume (data in excess of this volume is not necessary) and transmits request information for traffic information. A server provides the traffic information in response to the request. The client apparatus may be a car navigation system, a PC, or a portable terminal.

Figure 39:
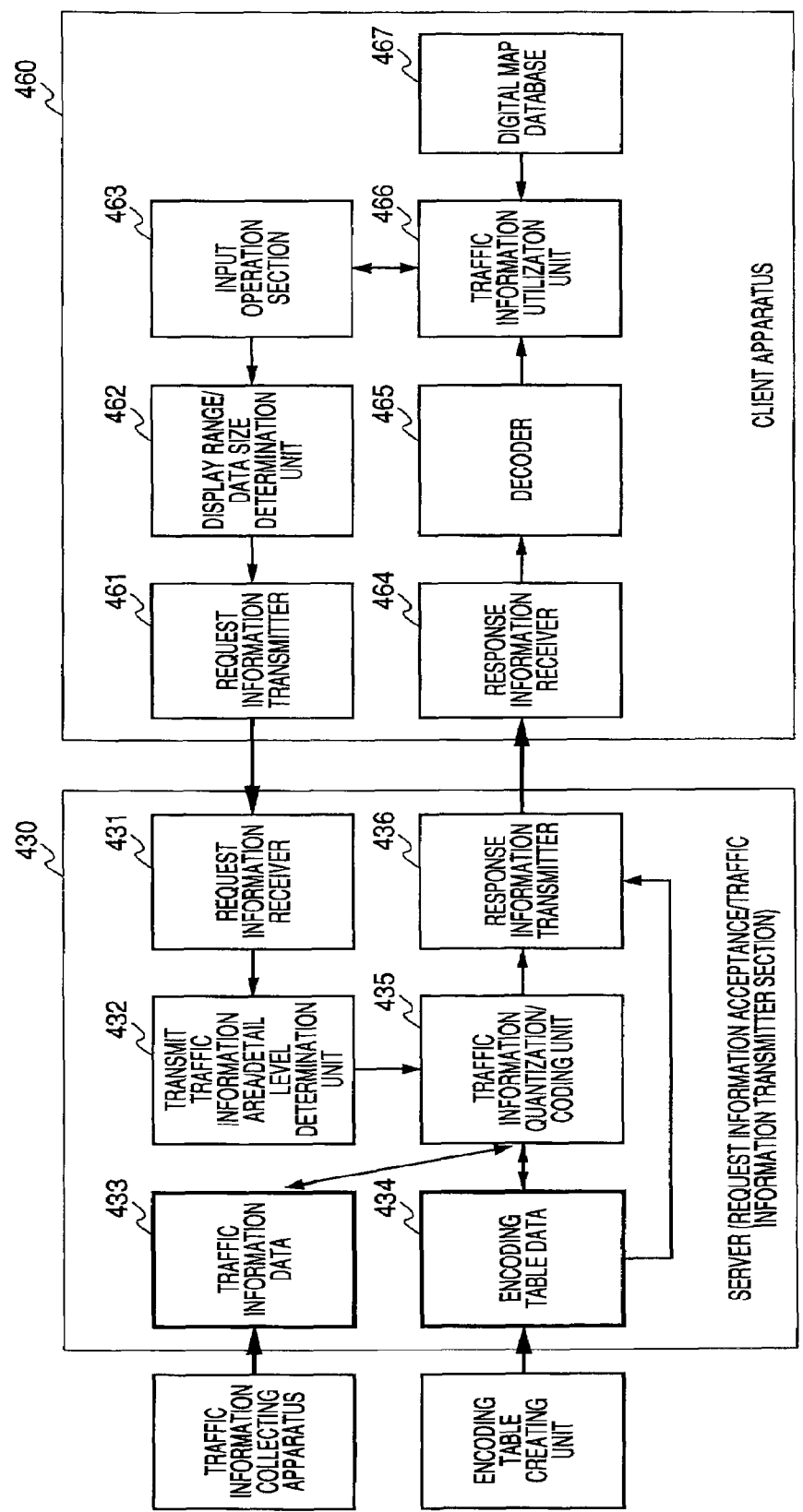
FIG. 39 is a system block diagram in the seventh embodiment of the invention.
Figure 40:
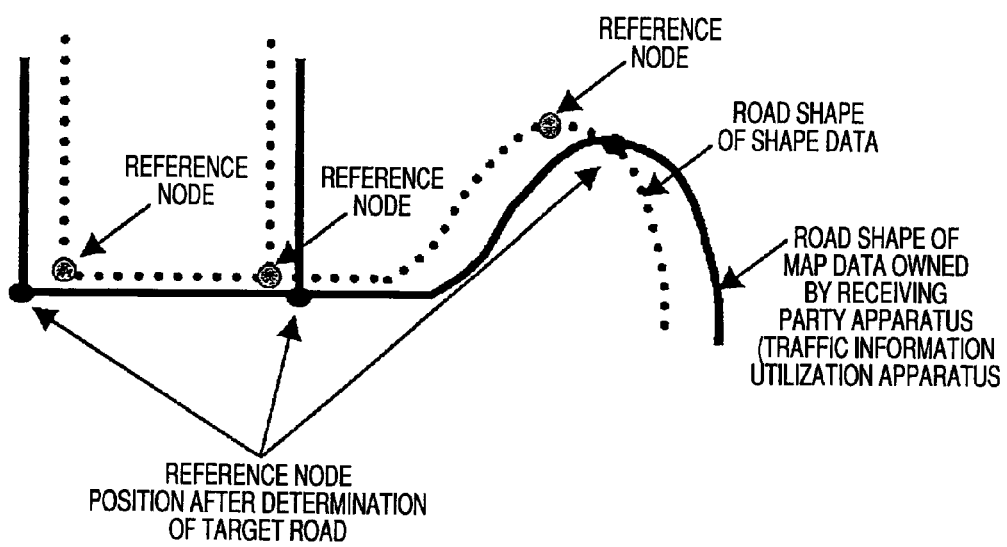
FIG. 40 illustrates a relative position correcting method using reference node in the related art.
Figure 41:
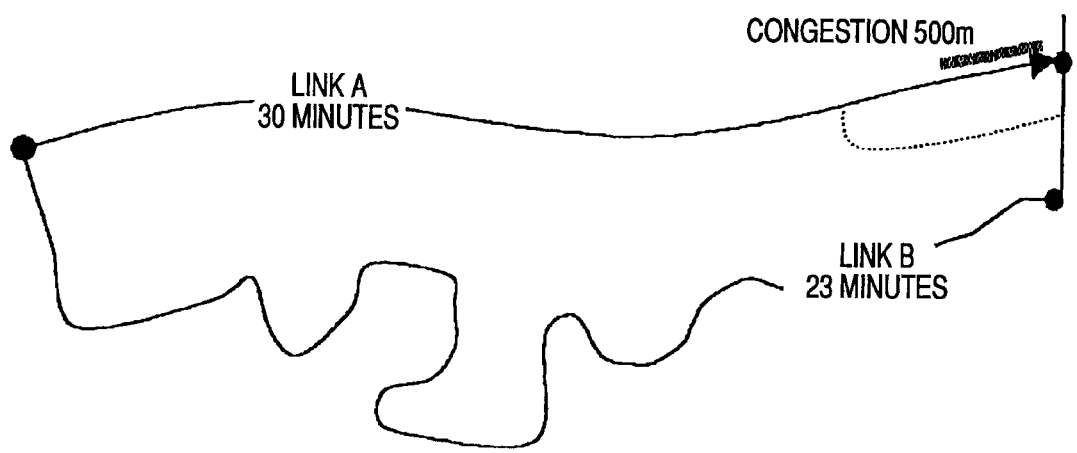
FIG. 41 illustrates the problems with traffic information in the related art.
Figure 42:
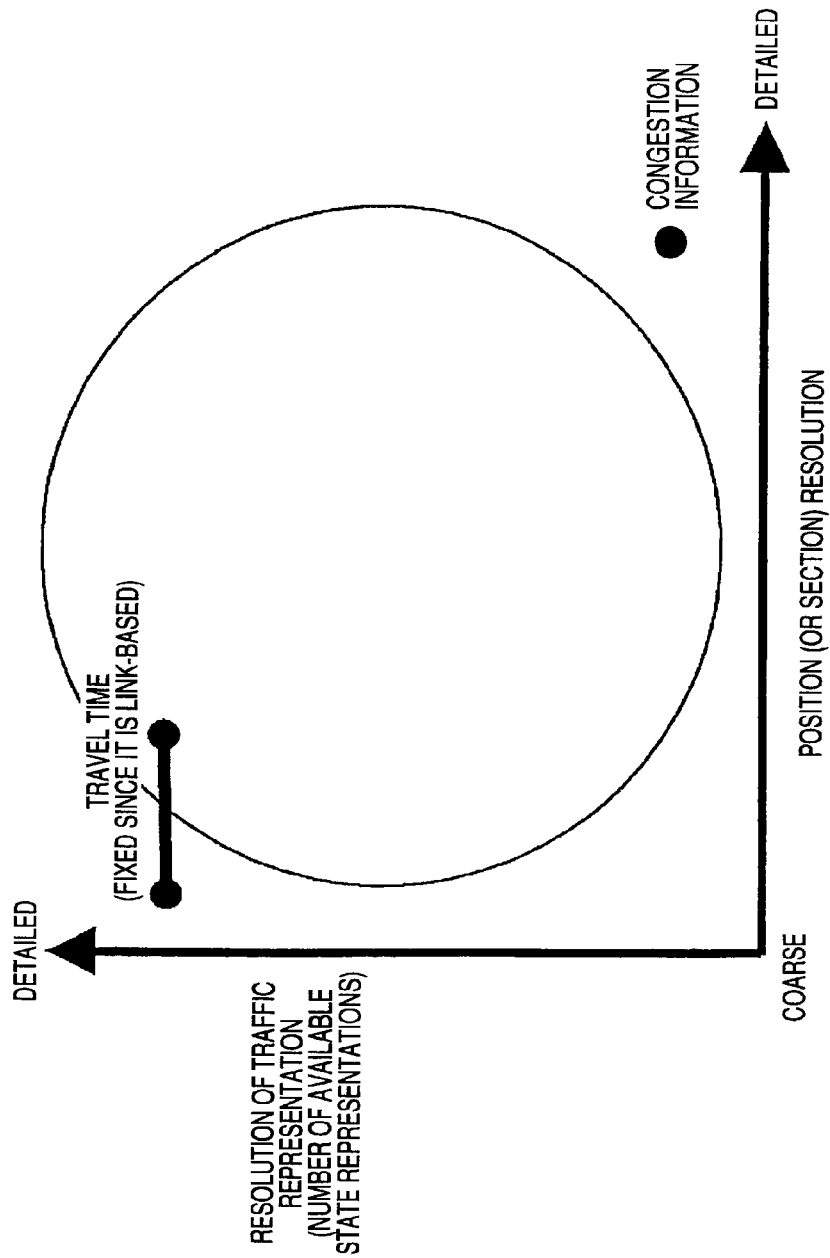
FIG. 42 illustrates the problems with the information display resolution of traffic information in the related art.
Figure 43B:
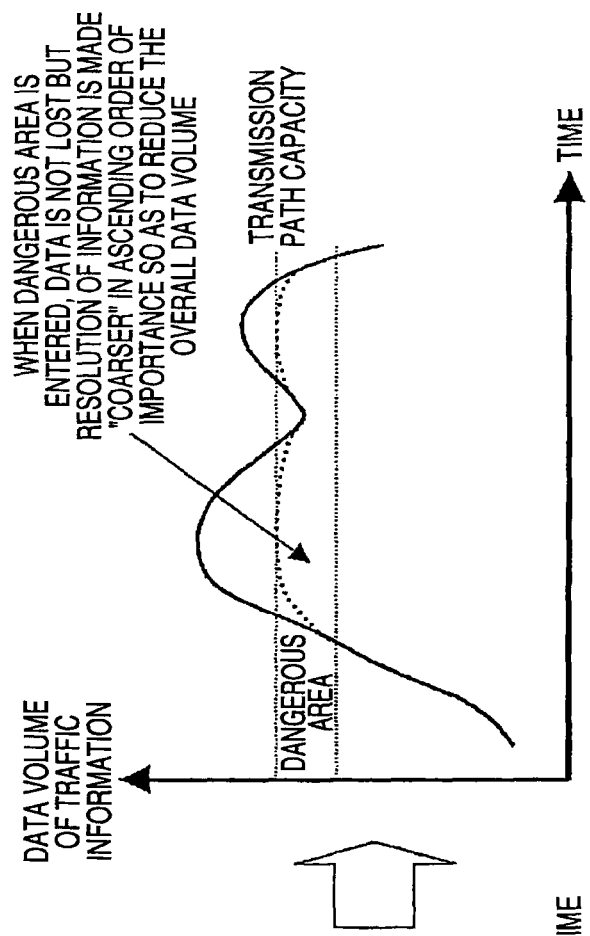
FIGS. 43(a) and 43(b) illustrate the problems with transmission of traffic information in the related art.
Figure 43A:
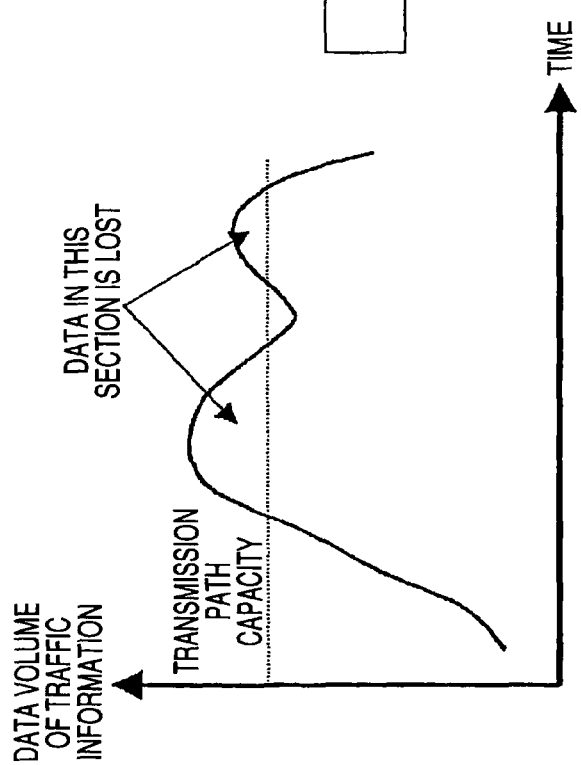

FIG. 39 is a block diagram of this system. Client apparatus 460 comprises: an input operation section 463 for the user to input a request; a display range/data size determination unit for determining the requested display range and data size; a request information transmitter for transmitting a request; a Response information receiver for receiving response information; a decoder 465 for decoding the encoded data; a traffic information utilization unit 466 for utilizing the reproduced traffic information; and a digital map database 467 referenced by the traffic information utilization unit 466.

A server 430 comprises: a request information receiver for receiving request information; a transmit traffic information area/detail level determination unit 432 for determining the area and detail level of traffic information to transmit; a traffic information quantization/coding unit 435 for encoding traffic information data 433 by using encoding table data 434; and a response information transmitter for transmitting encoded traffic information.

Figure 38:
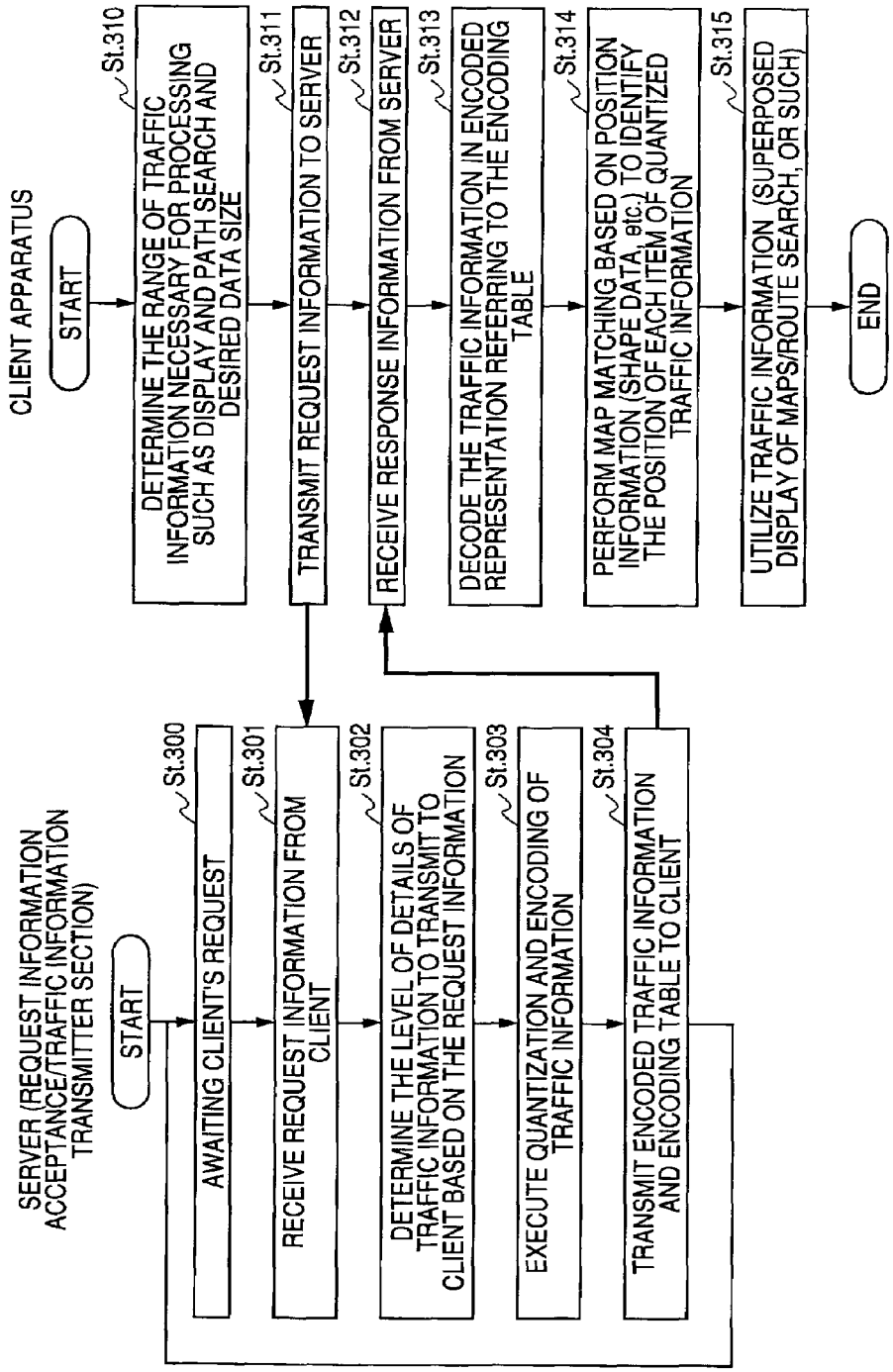
FIG. 38 is a flowchart of operation of a system in the seventh embodiment of the invention.

The flowchart of FIG. 38 shows the operation procedure of this system.

The client apparatus 460 determines the range and desired data size of traffic information necessary for display or path search (step 310) and transmits a request to a server 430 (step 311).

The server 430 which was awaiting a request from the client (step 300) receives request information from the client (step 301), determines the detail level of traffic information to transmit to the client from the request information (step 302), performs quantization and encoding of traffic information (step 303), and transmits the encoded traffic information and encoding table to the client (step 304). In this practice, the server 430 transmits data shown in FIGS. 8(a) and 8(b) and FIGS. 20(a) and 20(b) to the client.

The client apparatus 460, receiving response information from the server 430 (step 312), references the encoding table to decode the traffic information represented by a code (step 313), performs map matching based on the position information (such as shape data), identifies the position of received traffic information (step 314), thus utilizing the traffic information.

Figure 37:
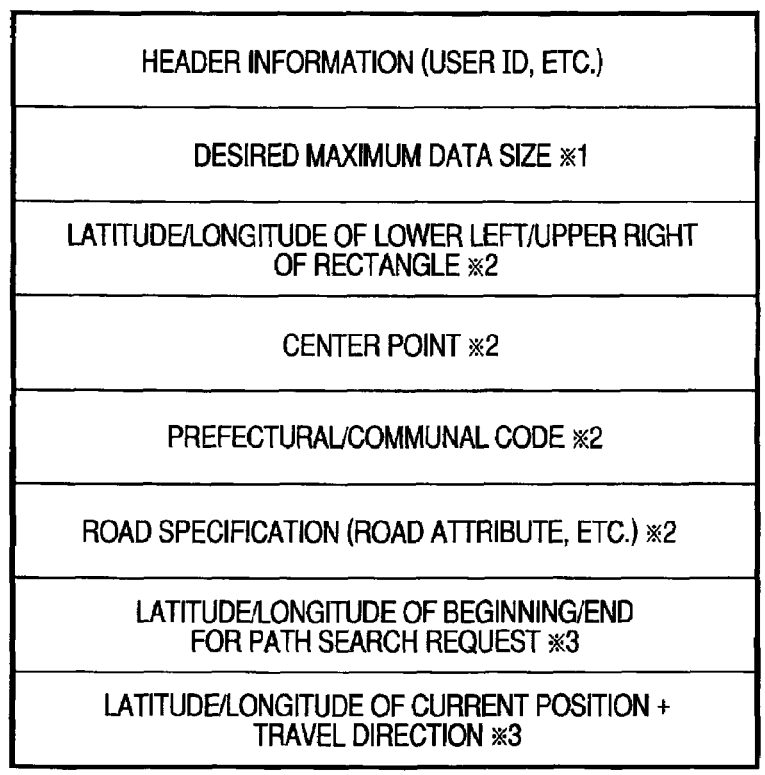
FIG. 37 is a data block diagram of request information in the seventh embodiment of the invention.

FIG. 37 shows an example of the request information.

The "desired maximum data size" may be a communications charge or communications time in the case of a packet billing system. The request range may be any of "latitude/longitude of lower left/upper right of rectangle", "center point", "prefectural/communal code", "road specification", "latitude/longitude of beginning/end for path search request", and "latitude/longitude of current position+travel direction". Or, any combination of these may be used.

The transmit traffic information area/detail level determination unit 432 determines the detail level of traffic information so that the traffic information on the recommended path will be more detailed in case the traffic information has been requested based on the "latitude/longitude of beginning/end for path search request", and that the traffic information will be less detailed with distance from the recommended path.

In case the traffic information is requested based on "latitude/longitude of current position+travel direction", the transmit traffic information area/detail level determination unit 432 determines the detail level of traffic information so that the traffic information in the travel direction near the current point and on the road the user is traveling along will be more detailed and less detailed with distance from the current point.

In this way, in the interactive provision of information, it is possible to minutely adjust the resolution of information representation in the traffic information in accordance with a request.

Adjustment is possible so that the prediction information around the predicted arrival time will be more detailed in accordance with the predicted travel time of arrival to each link and the prediction information will be less detailed as the time moves away from the predicted arrival time.

Eighth Embodiment

While traffic information provision apparatus (traffic information transmitter) working as a center provides traffic information utilization apparatus such as a vehicle-mounted car navigation system with traffic information in the foregoing embodiments, the traffic information generation method of the invention is applicable to a system where a probe-car-mounted machine to provide travel data works as traffic information provision apparatus and the center which collects information from a probe-car-mounted machine works as traffic information utilization apparatus, and the probe-car-mounted machine provides the center with various measurement information including a travel speed and a fuel consumption volume. An eighth embodiment of the invention pertains to such a probe car system.

Figure 46:
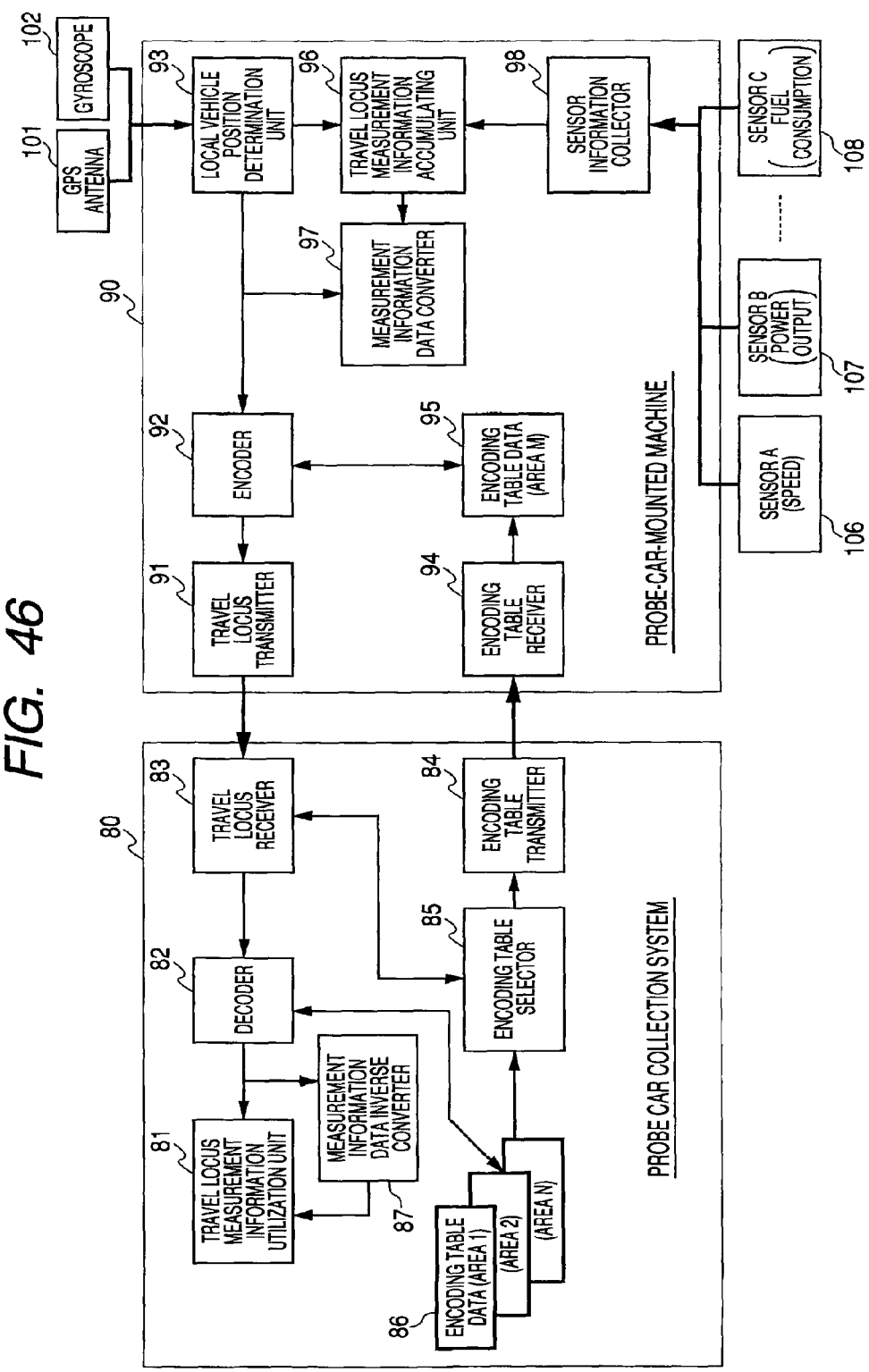
FIG. 46 is a block diagram of a probe car information collection system in an eighth embodiment of the invention.

As shown in FIG. 46, the system comprises a probe-car-mounted machine 90 for measuring and providing data in traveling and a probe car collection system 80 for collecting the data. The probe-car-mounted machine 90 comprises: an encoding table receiver 94 for receiving from the probe car collection system 80 an encoding table used for encoding of transmit data; a sensor A 106 for detecting the speed; a sensor B 107 for detecting power output; a sensor information collector 98 for collecting the detection information of the sensor 108 for detecting fuel consumption; a Local vehicle position determination unit 93 for determining the local vehicle position by using the information received by a GPS antenna 101 and the information from a gyroscope 102; a travel locus measurement information accumulating unit 96 for accumulating the travel locus of the local vehicle and the measurement information of sensors A, B, C, a measurement information data converter 97 for generating sampling data of measurement information; an encoder 92 for encoding the sampling data of measurement information and travel locus data by using received encoding table data 95; and a travel locus transmitter for transmitting the encoded data to the probe car collection system 80.

The probe car collection system 80 comprises: a travel locus receiver 83 for receiving travel data from the probe-car-mounted machine; a decoder 82 for decoding the received data by using the encoding table data 86; a measurement information data inverse converter 87 for reproducing the measurement information by using the decoded data; a travel locus measurement information utilization unit 81 for utilizing the reproduced measurement information and travel locus data; an encoding table selector 85 for selecting an encoding table to assign to the probe-car-mounted machine 90 in accordance with the current position of a probe car; and an encoding table transmitter 84 for transmitting the selected encoding table to the probe car.

Here, a case will be described where the encoding/compression method shown in the third embodiment, that is, a procedure for performing orthogonal transformation on traffic information and transmitting the resulting value represented by a coefficient of each frequency component.

A local vehicle position determination unit 93 of the probe-car-mounted machine 90 identifies the position of the local vehicle by using the information received by the GPS antenna 101 and the information from the gyroscope 102.

A sensor information collector 98 collects measurement values including speed information detected by the sensor A 106, engine load detected by the sensor B 107, and gasoline consumption volume detected by the sensor C 108. The measurement information collected by the sensor information collector is stored into a travel locus measurement information accumulating unit 96 in association with the local vehicle position identified by the local vehicle position determination unit 93.

A measurement information data converter 97 represents the measurement information accumulated in the Travel locus measurement information accumulating unit 96 by a function off distance from the measurement start point (reference point) of the road on which the user's vehicle is traveling, and generates the sampling data of the measurement information. An encoder 92 performs orthogonal transformation on the sampling data to transform the measurement information to a coefficient value of each frequency component and performs encoding of the travel locus data and the transformed coefficient value by using received encoding table data 95. The encoded travel locus data and measurement information are transmitted to a probe car collection system 80.

Receiving the data, the decoder of the probe car collection system 80 decodes the encoded travel locus data and measurement information by using encoding table data 86. A measurement information data inverse converter 87 performs orthogonal transformation by using the decoded coefficient value to reproduce the measurement information. A travel locus measurement information utilization unit 81 utilizes the decoded measurement information to create the traffic information on the road where the probe car has traveled.

In this way, the traffic information generation method of the invention can be used for generation of information uploaded from a robe-car-mounted machine.

While the invention has been described in detail referring to specific embodiments, those skilled in the art will recognize that various changes and modifications can be made in it without departing from the spirit and scope thereof.

The invention is based on the Japanese Patent Application No. 2002-089069 filed Mar. 27, 2002 and the Japanese Patent Application No. 2003-025037 filed Jan. 31, 2003 and the disclosure of which is incorporated herein by reference.

INDUSTRIAL APPLICABILITY

As understood from the foregoing description, the traffic information provision system of the invention can arbitrarily set a position resolution and a traffic representation resolution and change the resolution of information representation on demand in accordance with the importance of traffic information, and can flexibly support a "prediction service" of traffic information.

The invention claimed is:

1. A road information provision apparatus comprising:
a sampling point setting unit for setting sampling points along a road from a reference point of a road section specified by road section reference data with constant intervals;
a calculating unit for calculating state quantities of traffic information changing along the road in the road section for the sampling points based on original measurement information;
a traffic information converting unit for converting the calculated state of quantities of the traffic information for the sampling points to values concentrated around a specific value; and
an encoding unit for encoding and compressing the values obtained by the conversion.

2. The road information provision apparatus according to claim 1, wherein the state quantities include any one of a travel speed, a travel time and a congestion situation.

3. The road information provision apparatus according to claim 1, wherein the compression unit compresses the state quantities by transforming the state quantities to a coefficient value of a frequency component by way of orthogonal transformation.

4. The road information provision apparatus according to claim 3, wherein the compression unit compresses the state quantities by deleting values of high frequency components.

5. The road information provision apparatus according to claim 1, wherein the road information provision apparatus is one of a probe-car-mounted machine and a navigation system mounted on a vehicle.

6. The road information provision apparatus according to claim 1, wherein the road information provision apparatus is a center-side apparatus providing traffic information.

7. A road information utilizing apparatus for reproducing, on a digital map, the state quantities of the traffic information transmitted from the road information provision apparatus according to claim 1.

8. A road information provision apparatus comprising:
   a sampling point setting unit for setting sampling points by dividing a road section specified by road section reference data with constant intervals along a road;
   a calculating unit for calculating state quantities of traffic information changing along the road in the road section for the sampling points based on original measurement information;
   a traffic information converting unit for converting the calculated state quantities of the traffic information for the sampling points to values concentrated around a specific value; and
   an encoding unit for encoding and compressing the values obtained by the conversion.

9. The road information provision apparatus according to claim 8, wherein the state quantities include any one of a travel speed, a travel time and a congestion situation.

10. The road information provision apparatus according to claim 8, wherein the compression unit compresses the state quantities by transforming the state quantities to a coefficient value of a frequency component by way of orthogonal transformation.

11. The road information provision apparatus according to claim 10, wherein the compression unit compresses the state quantities by deleting values of high frequency components.

12. The road information provision apparatus according to claim 8, wherein the road information provision apparatus is one of a probe-car-mounted machine and a navigation system mounted on a vehicle.

13. The road information provision apparatus according to claim 8, wherein the road information provision apparatus is a center-side apparatus providing traffic information.

14. A road information utilizing apparatus for reproducing, on a digital map, the state quantities of the traffic information transmitted from the road information provision apparatus according to claim 8.

15. A road information provision method comprising:
   setting sampling points along a road from a reference point of a road section specified by road section reference data with constant intervals;
   calculating state quantities of traffic information changing along the road in the road section for the sampling points based on original measurement information;
   converting the calculated state quantities of the traffic information for the sampling points to values concentrated around a particular value; and
   encoding and compressing the values obtained by the conversion.

16. A computer readable recording medium storing a program which causes a computer to execute the method according to claim 15.

17. A road information provision method comprising:
   setting sampling points by-dividing a road section specified by road section reference data with constant intervals along a road;
   calculating state quantities of traffic information changing along the road in the road section for the sampling points based on original measurement information;
   converting the calculated state quantities of the traffic information for the sampling points to values concentrated around a specific value; and
   encoding and compressing the values obtained by the conversion.

18. A computer readable recording medium storing a program which causes a computer to execute the method according to claim 17.

* * * * *

UNITED STATES PATENT AND TRADEMARK OFFICE
CERTIFICATE OF CORRECTION

PATENT NO. : 7,747,381 B2
APPLICATION NO. : 12/048630
DATED : June 29, 2010
INVENTOR(S) : Shinya Adachi Page 1 of 1

It is certified that error appears in the above-identified patent and that said Letters Patent is hereby corrected as shown below:

In column 1, line 34, please replace "$\leqq$" with "$\geqq$"

Signed and Sealed this

Nineteenth Day of October, 2010

David J. Kappos
*Director of the United States Patent and Trademark Office*